US012658132B2

(12) United States Patent
Chung et al.

(10) Patent No.: US 12,658,132 B2
(45) Date of Patent: Jun. 16, 2026

(54) LIGHT EMITTING DISPLAY DEVICE

(71) Applicant: Samsung Display Co., Ltd., Yongin-si (KR)

(72) Inventors: Kyung Hoon Chung, Yongin-si (KR); Byung Chang Yu, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/013,910

(22) Filed: Jan. 8, 2025

(65) Prior Publication Data

US 2025/0148987 A1 May 8, 2025

Related U.S. Application Data

(62) Division of application No. 18/226,912, filed on Jul. 27, 2023, now Pat. No. 12,198,628.

(30) Foreign Application Priority Data

Aug. 4, 2022 (KR) ........................ 10-2022-0097340

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01);
(Continued)

(58) Field of Classification Search
CPC ... G09G 2300/0426; G09G 2300/0814; G09G 2300/0819; G09G 2300/0852;
(Continued)

(56) References Cited

U.S. PATENT DOCUMENTS 10,181,289 B1 * 1/2019 Chen .................... G09G 3/3258
10,223,967 B1 3/2019 Kuang et al.
(Continued)

FOREIGN PATENT DOCUMENTS

KR 101202039 B1 11/2012
KR 10-2017-0089400 A 8/2017
(Continued)

*Primary Examiner* — Amen W Bogale
(74) *Attorney, Agent, or Firm* — F. CHAU & ASSOCIATES, LLC

(57) ABSTRACT

A light emitting display device includes: a light emitting element including an anode connected to a first line; a first transistor; a second transistor including a first electrode connected to a data line, and a second electrode connected to a gate electrode of the first transistor; a third transistor including a first electrode connected to the first line, and a second electrode connected to a first electrode of the first transistor; a fourth transistor including a second electrode connected to the gate electrode; a sixth transistor including a first electrode connected to a second electrode of the first transistor, and a second electrode connected to a second line; a first capacitor including a first electrode connected to the gate electrode and a second electrode connected to the second electrode of the first transistor; and a second capacitor including a second electrode connected to the second electrode of the first transistor.

20 Claims, 32 Drawing Sheets

(52) U.S. Cl.
CPC . *G09G 2300/0852* (2013.01); *G09G 2310/08* (2013.01); *G09G 2320/0233* (2013.01); *G09G 2320/045* (2013.01)

(58) Field of Classification Search
CPC ....... G09G 2310/08; G09G 2320/0233; G09G 2320/045; G09G 3/3233; G09G 2300/0842
See application file for complete search history.

(56) References Cited

U.S. PATENT DOCUMENTS

| | | | | |
|---|---|---|---|---|
| 10,783,830 | B1 * | 9/2020 | Lu | G09G 3/3258 |
| 2010/0220038 | A1 | 9/2010 | Chung et al. | |
| 2015/0268763 | A1 | 9/2015 | Zhou et al. | |
| 2017/0213506 | A1 | 7/2017 | Shibusawa et al. | |
| 2021/0327341 | A1 | 10/2021 | Kim et al. | |
| 2022/0013066 | A1 | 1/2022 | Mao | |
| 2022/0101778 | A1 * | 3/2022 | Kim | G09G 3/3233 |
| 2023/0061839 | A1 | 3/2023 | In et al. | |

FOREIGN PATENT DOCUMENTS

| | | | |
|---|---|---|---|
| KR | 102016391 | B1 | 8/2019 |
| KR | 20200129242 | A | 11/2020 |
| KR | 10-2021-0130311 | A | 11/2021 |
| KR | 20220020473 | A | 2/2022 |
| KR | 20220025996 | A | 3/2022 |
| KR | 1020230030104 | | 3/2023 |

* cited by examiner

LIGHT EMITTING DISPLAY DEVICE

This is a divisional application of U.S. patent application Ser. No. 18/226,912 filed Jul. 27, 2023 (now pending), the disclosure of which is incorporated herein by reference in its entirety. U.S. patent application Ser. No. 18/226,912 claims priority to Korean Patent Application No. 10-2022-0097340 filed on Aug. 4, 2022, and all the benefits accruing therefrom under 35 U.S.C. § 119, the content of which in its entirety is herein incorporated by reference.

BACKGROUND

1. Field

The present disclosure relates to a light emitting display device, and more specifically, to a light emitting display device having a pixel to which a pixel driving circuit for driving a light emitting element and a cathode of the light emitting element are connected.

2. Description of the Related Art

A display device is a device for displaying an image, and includes a liquid crystal display ("LCD"), an organic light emitting diode ("OLED") display, and the like. The display device is used in various electronic devices such as a mobile phone, a navigation device, a digital camera, an electronic book, a portable game machine, and various terminals.

A display device such as an organic light emitting display device may have a structure that can be bent or folded by using a flexible substrate.

A structure of a pixel used in the organic light emitting device is being variously developed.

The above information disclosed in this Background section is only for enhancement of understanding of the background of the described technology, and therefore it may contain information that does not form the prior art that is already known in this country to a person of ordinary skill in the art.

SUMMARY

Embodiments are to provide an inverted pixel having a novel structure, that is, a pixel in which a pixel driving circuit for driving a light emitting element and a cathode of the light emitting element are connected.

An embodiment provides a light emitting display device including: a light emitting element including a cathode, and an anode connected to a first driving voltage line; a first transistor including a gate electrode, a first electrode, and a second electrode; a second transistor including a gate electrode, a first electrode connected to a data line, and a second electrode connected to the gate electrode of the first transistor; a third transistor including a gate electrode, a first electrode connected to the first driving voltage line, and a second electrode connected to the first electrode of the first transistor; a fourth transistor including a gate electrode, a first electrode connected to a reference voltage line, and a second electrode connected to the gate electrode of the first transistor; a sixth transistor including a gate electrode, a first electrode connected to the second electrode of the first transistor, and a second electrode connected to a second driving voltage line; a first capacitor including a first electrode connected to the gate electrode of the first transistor and a second electrode connected to the second electrode of the first transistor; and a second capacitor including a first electrode and a second electrode connected to the second electrode of the first transistor.

The light emitting display device may further include: a fifth transistor including a gate electrode, a first electrode connected to the cathode of the light emitting element, and a second electrode connected to the first electrode of the first transistor.

The second electrode of the second capacitor may be connected to the first electrode of the sixth transistor and the second electrode of the first capacitor.

The first electrode of the second capacitor may be connected to the first driving voltage line or the second driving voltage line, or may be applied with one of a sustain voltage, a reference voltage, a hold voltage, and a ground voltage.

The gate electrode of the second transistor may be connected to a first scan line; the gate electrode of the third transistor may be connected to a second scan line; the gate electrode of the fourth transistor may be connected to a third scan line; the gate electrode of the fifth transistor may be connected to a first light emitting signal line; and the gate electrode of the sixth transistor may be connected to a second light emitting signal line.

In a light emitting period, a gate-on voltage of the fifth transistor may be applied to the first light emitting signal line, and a gate-on voltage of the sixth transistor may be applied to the second light emitting signal line; in an initialization period, a gate-on voltage of the fourth transistor may be applied to the third scan line, and the gate-on voltage of the sixth transistor may be applied to the second light emitting signal line; in a compensation period, a gate-on voltage of the third transistor may be applied to the second scan line, and the gate-on voltage of the fourth transistor may be applied to the third scan line; and in a writing period, a gate-on voltage of the second transistor may be applied to the first scan line.

The light emitting period, the initialization period, the compensation period, and the writing period may be sequentially repeated; the second light emitting signal line may have a time duration when a gate-off voltage of the sixth transistor is applied thereto between a time duration when the gate-on voltage of the sixth transistor is applied thereto in the light emitting period and a time duration when the gate-on voltage of the sixth transistor is applied thereto in the initialization period; and the third scan line continuously may apply the gate-on voltage of the fourth transistor in the initialization period and the compensation period.

The light emitting display device may further include a seventh transistor including a gate electrode, a first electrode connected to the first driving voltage line, and a second electrode connected to the first electrode of the fifth transistor.

The gate electrode of the seventh transistor may be connected to the second scan line.

Another embodiment provides a light emitting display device including: a light emitting element including a cathode, and an anode connected to a first driving voltage line; a first transistor including a gate electrode, a first electrode, and a second electrode; a second transistor including a gate electrode, a first electrode connected to a data line, and a second electrode connected to the gate electrode of the first transistor; a third transistor including a gate electrode, a first electrode, and a second electrode connected to the first electrode of the first transistor; a fourth transistor including a gate electrode, a first electrode connected to a reference voltage line, and a second electrode connected to the gate electrode of the first transistor; a fifth transistor including a gate electrode, a first electrode connected to the cathode, and a second electrode connected to the first electrode of the first transistor; a sixth transistor including a gate electrode, a first electrode connected to the second electrode of the first transistor, and a second electrode connected to a second driving voltage line; a seventh transistor including a gate electrode, a first electrode, and a second electrode connected to the cathode; an eighth transistor including a gate electrode, a first electrode connected to an initialization voltage line, and a second electrode connected to the second electrode of the first transistor; a first capacitor including a first electrode connected to the gate electrode of the first transistor and a second electrode connected to the second electrode of the first transistor; and a second capacitor including a first electrode and a second electrode connected to the second electrode of the first transistor.

The gate electrode of the second transistor may be connected to a first scan line; the gate electrode of the third transistor and the gate electrode of the seventh transistor may be connected to a second scan line; the gate electrode of the fourth transistor may be connected to a third scan line; and the gate electrode of the eighth transistor may be connected to a fourth scan line.

In an initialization period, a gate-on voltage of the fourth transistor may be applied to the third scan line, a gate-on voltage of the eight transistor may be applied to the fourth scan line, a gate-off voltage of the second transistor may be applied to the first scan line, and a gate-off voltage of the third transistor and the seventh transistor may be applied to the second scan line.

In a compensation period, a gate-on voltage of the third transistor and the seventh transistor may be applied to the second scan line, the gate-on voltage of the fourth transistor may be applied to the third scan line, the gate-off voltage of the second transistor may be applied to the first scan line, and a gate-off voltage of the eight transistor may be applied to the fourth scan line.

In a writing period, a gate-on voltage of the second transistor may be applied to the first scan line, the gate-off voltage of the third transistor and the seventh transistor may be applied to the second scan line, a gate-off voltage of the fourth transistor may be applied to the third scan line, and the gate-off voltage of the eight transistor may be applied to the fourth scan line.

The gate electrode of the fifth transistor and the gate electrode of the sixth transistor may be connected to a first light emitting signal line.

In a light emitting period, a gate-on voltage of the fifth transistor and the sixth transistor may be applied to the first light emitting signal line, a gate-off voltage of the second transistor may be applied to the first scan line, a gate-off voltage of the third transistor and the seventh transistor may be applied to the second scan line, a gate-off voltage of the fourth transistor may be applied to the third scan line, and a gate-off voltage of the eight transistor may be applied to the fourth scan line.

The first electrode of the third transistor and the first electrode of the seventh transistor may be connected to the first driving voltage line.

The first electrode of the third transistor and the first electrode of the seventh transistor may receive a voltage different from a voltage applied to the first driving voltage line. The first electrode of the second capacitor may be connected to the first driving voltage line.

The first electrode of the second capacitor may receive a voltage different from a voltage applied to the first driving voltage line.

According to the embodiments, it is possible to provide a display device including a pixel (an inverted pixel) that has a novel structure and in which a light emitting element is positioned at a first driving voltage line side with respect to a first transistor.

According to the embodiments, it is possible to improve display quality by removing the voltage drop problem that occurs while a threshold voltage and a low driving voltage of the first transistor are applied.

In addition, since a pixel has an inverted pixel structure, a light emitting element is separated from a source electrode of a first transistor, so that when a voltage of each portion of a pixel driving circuit part is changed, a voltage fluctuation of the source electrode of the first transistor may be small.

DETAILED DESCRIPTION

Figure 1:
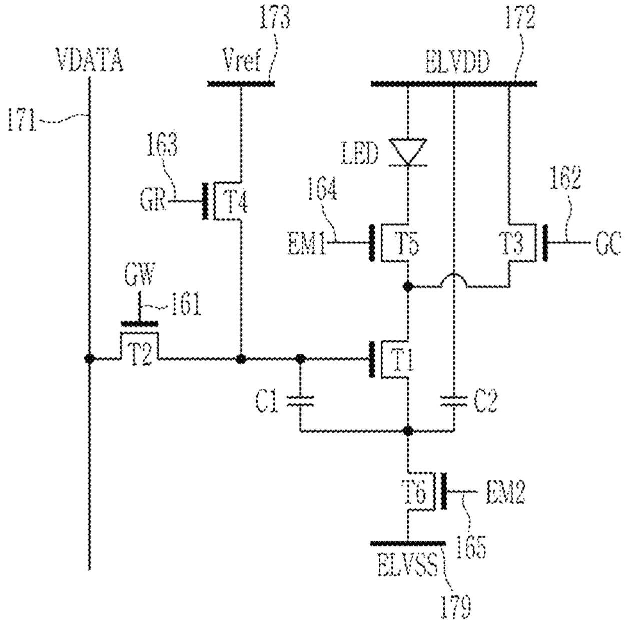
FIG. 1 illustrates an equivalent circuit diagram of one pixel included in a light emitting display device according to an embodiment.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

In order to clearly describe the present invention, parts or portions that are irrelevant to the description are omitted, and identical or similar constituent elements throughout the specification are denoted by the same reference numerals.

Further, in the drawings, the size and thickness of each element are arbitrarily illustrated for ease of description, and the present disclosure is not necessarily limited to those illustrated in the drawings. In the drawings, the thicknesses of layers, films, panels, regions, areas, etc., are exaggerated for clarity. In the drawings, for ease of description, the thicknesses of some layers and areas are exaggerated.

It will be understood that when an element such as a layer, film, region, area, substrate, plate, or constituent element is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

In addition, throughout the specification, "connected" does not only mean when two or more elements are directly connected, but when two or more elements are indirectly connected through other elements, and when they are physically connected or electrically connected, and further, it may be referred to by different names depending on a position or function, and may also be referred to as a case in which respective parts that are substantially integrated are linked to each other.

In addition, throughout the specification, when it is said that an element such as a wire, layer, film, region, area, substrate, plate, or constituent element "is extended (or extends) in a first direction or second direction", this does not mean only a straight shape extending straight in the corresponding direction, but may mean a structure that substantially extends in the first direction or the second direction, is partially bent, has a zigzag structure, or extends while having a curved structure.

In addition, both an electronic device (for example, a mobile phone, a TV, a monitor, a laptop computer, etc.) including a display device, or a display panel described in the specification, and an electronic device including a display device and a display panel manufactured by a manufacturing method described in the specification are not excluded from the scope of the present specification.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

Hereinafter, a circuit structure of one pixel of a light emitting display device according to an embodiment will be described with reference to FIG. 1.

FIG. 1 illustrates an equivalent circuit diagram of one pixel included in a light emitting display device according to an embodiment.

Referring to FIG. 1, one pixel includes a light emitting element LED and a pixel driving circuit part for driving the same, and the pixel driving circuit part may be arranged in a matrix form. The pixel driving circuit part includes all elements except for the light emitting element LED in FIG. 1, and the pixel driving circuit part of the pixel according to the embodiment of FIG. 1 includes a first transistor T1, a second transistor T2, a third transistor T3, a fourth transistor T4, a fifth transistor T5, a sixth transistor T6, a first capacitor C1, and a second capacitor C2.

In addition, the pixel driving circuit part may be connected to a first scan line 161 to which a first scan signal GW is applied, a second scan line 162 to which a second scan signal GC is applied, a third scan line 163 to which a third scan signal GR is applied, a first light emitting signal line 164 to which a first light emitting signal EM1 is applied, a second light emitting signal line 165 to which a second light emitting signal EM2 is applied, and a data line 171 to which a data voltage VDATA is applied. In addition, the pixel may be connected to a first driving voltage line 172 to which a high driving voltage ELVDD (hereinafter referred to as a "first driving voltage") is applied, a second driving voltage line 179 to which a low driving voltage ELVSS (hereinafter referred to as a "second driving voltage") is applied, and a reference voltage line 173 to which a reference voltage Vref is applied.

A circuit structure of the pixel will now be described focusing on respective elements (the transistors, the capacitor, and the light emitting element) included in the pixel as follows.

The first transistor T1 (hereinafter also referred to as "driving transistor") includes: a gate electrode, first electrode (an input side electrode) and a second electrode (an output side electrode). Here, the gate electrode of the first transistor T1 is connected to a first electrode of the first capacitor C1, a second electrode of the second transistor T2, and a second electrode of the fourth transistor T4. The first electrode of the first transistor T1 is connected to a second electrode of the third transistor T3 and a second electrode of the fifth transistor T5. The second electrode of the first transistor T1 is connected to a first electrode of the sixth transistor T6, a second electrode of the first capacitor C1, and a second electrode of the second capacitor C2.

In the first transistor T1, a degree to which the first transistor T1 is turned on is determined according to a voltage of the gate electrode thereof, and an amount of a current flowing from the first electrode to the second electrode of the first transistor T1 is determined according to the turned-on degree. The current flowing from the first electrode to the second electrode of the first transistor T1 is the same as a current flowing through the light emitting element LED in a light emitting period, so it may be referred to as a "light emitting current". Here, the first transistor T1 is an n-type transistor, and as a voltage of the gate electrode thereof increases, a large light emitting current may flow. When the light emitting current is large, the light emitting element LED may display high luminance.

The second transistor T2 (hereinafter also referred to as a "data input transistor") includes: a gate electrode connected to the first scan line 161 to which the first scan signal GW is applied; a first electrode (an input-side electrode) connected to the data line 171 to which the data voltage VDATA is applied; and a second electrode (an output-side electrode) connected to the first electrode of the first capacitor C1, the gate electrode of the first transistor T1, and the second electrode of the fourth transistor T4. The second transistor T2 inputs the data voltage VDATA into the pixel according to the first scan signal GW to transmit the data voltage VDATA to the gate electrode of the first transistor T1 and to store the data voltage VDATA in the first electrode of the first capacitor C1.

The third transistor T3 (hereinafter also referred to as a "first voltage transmitting transistor") includes: a gate electrode connected to the second scan line 162 to which the second scan signal GC is applied; a first electrode (an input-side electrode) connected to the first driving voltage line 172; and a second electrode (an output-side electrode) connected to the first electrode of the first transistor T1 and the second electrode of the fifth transistor T5. The third transistor T3 allows the first driving voltage ELVDD to be transmitted to the first transistor T1 without passing through the light emitting element LED. Since a problem that the light emitting element LED unnecessarily emits light may occur if a current flows through the light emitting element LED during a period when the light emission is not necessary, this is to transmit the first driving voltage ELVDD to the first transistor T1 through a separate path. Therefore, the third transistor T3 may not be turned on during a light emitting period, and may be turned on during other periods.

The fourth transistor T4 (hereinafter also referred to as a "reference voltage transfer transistor") includes: a gate electrode connected to the third scan line 163 to which the third scan signal GR is applied; a first electrode connected to the reference voltage line 173; and a second electrode connected to the first electrode of the first capacitor C1, the gate electrode of the first transistor T1, and the second electrode of the second transistor T2. The fourth transistor T4 serves to transmit the reference voltage Vref to the first electrode of the first capacitor C1 and the gate electrode of the first transistor T1 to initialize the first capacitor C1 and the first transistor T1.

The fifth transistor T5 (hereinafter also referred to as a "cathode connecting transistor") includes: a gate electrode connected to the first light emitting signal line 164 to which the first light emitting signal EM1 is applied; a first electrode connected to a cathode of the light emitting element LED; and a second electrode connected to the first electrode of the first transistor T1 and the second electrode of the third transistor T3. The fifth transistor T5 may connect the first electrode of the first transistor T1 and the light emitting element LED based on the first light emitting signal EM1 to form a current path and to allow the light emitting element LED to emit light.

The sixth transistor T6 (hereinafter also referred to as a "low driving voltage applying transistor") includes: a gate electrode connected to the second light emitting signal line 165 to which the second light emitting signal EM2 is applied; a first electrode; and a second electrode for receiving the second driving voltage ELVSS. Here, the first electrode of sixth transistor T6 is connected to the second electrode of the first transistor T1, the second electrode of the first capacitor C1, and the second electrode of the second capacitor C2. The sixth transistor T6 serves to transmit or block the second driving voltage ELVSS to the second electrode of the first transistor T1 based on the second light emitting signal EM2.

In the embodiment of FIG. 1, all the transistors are n-type transistors, and each transistor may be turned on when the voltage of the gate electrode is a high level voltage, and may be turned off when the voltage of the gate electrode is a low level voltage. In addition, a semiconductor layer included in each transistor may use a polycrystalline silicon semiconductor or an oxide semiconductor, and may additionally use an amorphous semiconductor or a single crystal semiconductor.

In some embodiments, the semiconductor layer included in each transistor may further include an overlapping layer (or an additional gate electrode) overlapping the semiconductor layer, and by applying a voltage to the overlapping layer (the additional gate electrode) to change characteristics of the transistor, it is possible to further improve the display quality of the pixel.

The first capacitor C1 includes: a first electrode and a second electrode. Here, the first electrode of the first capacitor C1 is connected to the gate electrode of the first transistor T1, the second electrode of the second transistor T2, and the second electrode of the fourth transistor T4.

The second electrode of the first capacitor C1 is connected to the second electrode of the first transistor T1, the first electrode of the sixth transistor T6, and the second electrode of the second capacitor C2. The first electrode of the first capacitor C1 serves to receive the data voltage VDATA from the second transistor T2 to store the data voltage VDATA.

The second capacitor C2 includes: a first electrode connected to the first driving voltage line 172; and a second electrode connected to the second electrode of the first transistor T1, the first electrode of the sixth transistor T6, and the second electrode of the first capacitor C1. The second capacitor C2 serves to constantly maintain voltages of the second electrode of the first transistor T1 and the second electrode of the first capacitor C1. Meanwhile, in some embodiments, the second capacitor C2 may be omitted.

The light emitting element LED includes: an anode connected to the first driving voltage line 172 to receive the first driving voltage ELVDD; and a cathode connected to the first electrode of the fifth transistor T5. The light emitting element LED is connected to the first transistor T1 through the fifth transistor T5. The light emitting element LED is positioned between the pixel driving circuit part and the first driving voltage line 172, and the same current as the current flowing through the first transistor T1 of the pixel driving circuit part flows in the light emitting element LED, and luminance at which light emitting element LED emits light may also be determined according to an amount of a corresponding current. The light emitting element LED may include a light emitting layer including at least one of an organic light emitting material and an inorganic light emitting material between the anode and the cathode thereof. A detailed stacked structure of the light emitting element LED according to the embodiment will be described with reference to FIG. 31 and FIG. 32.

The pixel according to the embodiment of FIG. 1 may perform a compensation operation for sensing a change in a characteristic (a threshold voltage) of the first transistor T1 to display constant display luminance regardless of the change in the characteristic (the threshold voltage) of the first transistor T1.

In addition, in FIG. 1, the light emitting element LED is positioned between the first electrode of the first transistor T1 and the first driving voltage line 172. The pixel according to the present embodiment is also referred to as an "inverted pixel" in order to distinguish the inverted pixel from a pixel in which a light emitting element is positioned between the first transistor T1 and the second driving voltage line 179. The light emitting element displays luminance according to an amount of a current flowing in a current path connected from the first driving voltage ELVDD to the second driving voltage ELVSS through the first transistor T1, and as the amount of the current increases, the displayed luminance may increase. In the inverted pixel structure of FIG. 1, since the first electrode of the first transistor T1 is connected to the light emitting element LED, and is separated from the second electrode (source electrode) of the first transistor T1, when a voltage of each part of the pixel driving circuit is changed, a voltage of the second electrode (source electrode) of the first transistor T1 may not be changed. More specifically, when the sixth transistor T6 is turned on, as the voltage of the second electrode of the first capacitor C1 decreases, the voltage of the first electrode of the first capacitor C1 also decreases, and due to this, although the output current outputted from the first transistor T1 may also decrease, in the present embodiment, the problem of such a decrease in the output current of the first transistor T1 is eliminated. This will be described in detail with reference to FIG. 2 to FIG. 6.

In the embodiment of FIG. 1, it has been described that one pixel PX includes six transistors T1 to T6 and two capacitors (the first capacitor C1 and the second capacitor C2), but the present invention is not limited thereto, and in some embodiments, an additional capacitor or transistor may be further included, and some capacitors or transistors may be omitted.

In the above, the circuit structure of the pixel according to the embodiment has been described with reference to FIG. 1.

Hereinafter, a waveform of a signal applied to the pixel of FIG. 1 and an operation of the pixel according to the waveform will be described in detail with reference to FIG. 2 to FIG. 6.

Figure 2:
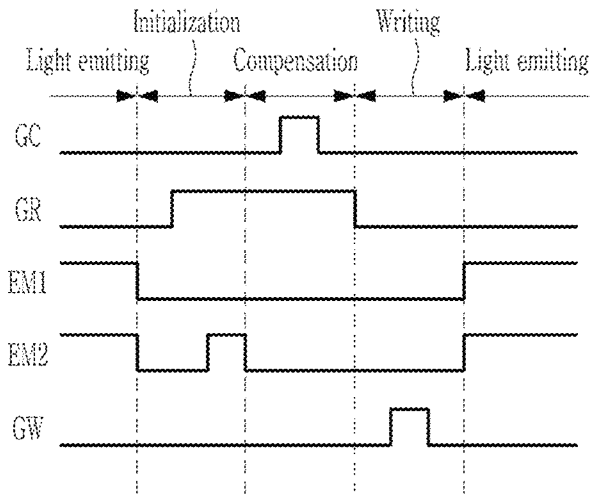
FIG. 2 illustrates a waveform diagram of a signal applied to the pixel of FIG. 1.

FIG. 2 illustrates a waveform diagram of a signal applied to the pixel of FIG. 1, and FIG. 3 to FIG. 6 illustrate drawings for explaining an operation of the pixel of FIG. 1 for each period based on the signal of FIG. 2.

Referring to FIG. 2, when the signal applied to the pixel is divided into periods, it is divided into an initialization period, a compensation period, a writing period, and a light emitting period.

First, the light emitting period is a period in which the light emitting element LED emits light, and the first and second light emitting signals EM1 and EM2 of a gate-on voltage (a high-level voltage) are applied to the fifth transistor T5 and the sixth transistor T6 to be turned on. In this case, the first scan signal GW, the second scan signal GC, and the third scan signal GR of a gate-off voltage (a low-level voltage) are applied. As a result, a current path connected from the first driving voltage ELVDD to the second driving voltage ELVSS through the light emitting element LED, the fifth transistor T5, the first transistor T1, and the sixth transistor T6 is formed. An amount of a current flowing through the current path is determined according to a degree at which a channel of the first transistor T1 is turned on, and the degree at which the channel of the first transistor T1 is turned on is determined according to a voltage of the gate electrode of the first transistor T1 (or the first electrode of the first capacitor C1). Accordingly, as the output current generated according to the voltage of the gate electrode of the first transistor T1 flows along the current path including the light emitting element LED, the light emitting element LED emits light. In FIG. 2, the light emitting period in which the light emitting signal of a gate-on voltage (a high level voltage) is applied is illustrated just in part, but in reality, the light emitting period actually has the longest time. However, since only the above simple operation is performed in the light emitting period, the light emitting period is simply illustrated in FIG. 2.

As the first and second light emitting signals EM1 and EM2 are changed to a gate-off voltage (a low level voltage), the light emitting period ends, and an initialization period is entered.

Referring to FIG. 2, in the initialization period, the third scan signal GR is first changed to a gate-on voltage (a high level voltage), and then the second light emitting signal EM2 is changed to a gate-on voltage (a high level voltage). In this case, the first scan signal GW, the second scan signal GC, and the first light emitting signal EM1 of the gate-off voltage (the low level voltage) are applied.

Figure 3:
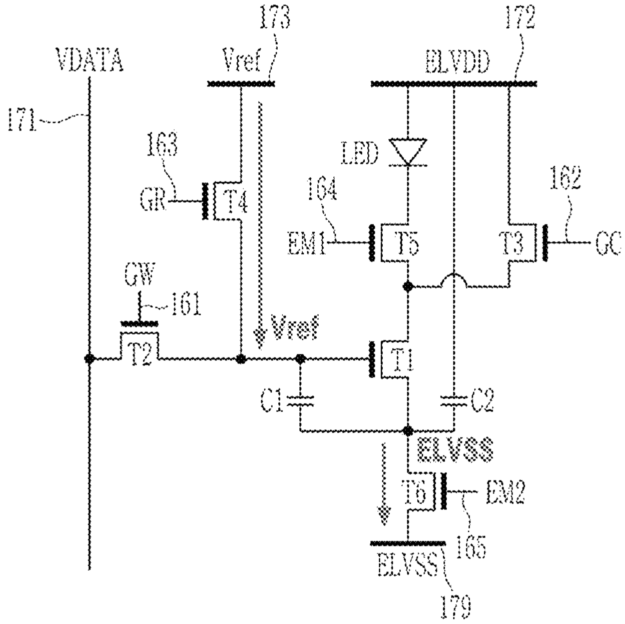
FIG. 3 to FIG. 6 illustrate drawings for explaining an operation of the pixel of FIG. 1 for each period based on the signal of FIG. 2.

Referring to FIG. 3, the fourth transistor T4 connected to the third scan signal GR that is first changed to the gate-on voltage (high level voltage) to be applied is turned on, so that the reference voltage Vref is applied to the gate electrode of the first transistor T1 and the first electrode of the first capacitor C1 to be initialized. Here, the reference voltage Vref may have a voltage value capable of turning on the first transistor T1.

Thereafter, the second light emitting signal EM2 is also applied while being changed to the gate-on voltage (high level voltage) so that the sixth transistor T6 is also turned on, and as a result, the second electrode of the first transistor T1, the second electrode of the first capacitor C1, and the second electrode of the second capacitor C2 are initialized to the second driving voltage ELVSS.

Thereafter, as the second light emitting signal EM2 is changed to the gate-off voltage (low level voltage), the initialization period ends, and the compensation period is entered.

Referring to FIG. 2, in the compensation period, the second scan signal GC is changed to the gate-on voltage (high level voltage) while the third scan signal GR is maintained at the gate-on voltage (high level voltage). In this case, the first scan signal GW, the first light emitting signal EM1, and the second light emitting signal EM2 of the gate-off voltage (the low level voltage) are applied.

Figure 4:
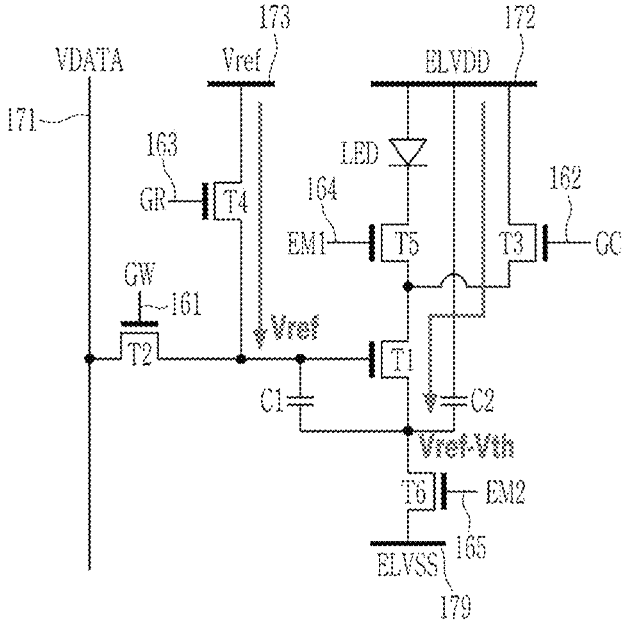

Referring to FIG. 4, while the reference voltage Vref is continuously transmitted to the gate electrode of the first transistor T1 and the first electrode of the first capacitor C1 through the turned-on fourth transistor T4, the third transistor T3 is also turned on by the second scan signal GC of the additionally applied gate-on voltage (high level voltage), and the first driving voltage ELVDD is transmitted to the first electrode of the first transistor T1. In this case, since the first transistor T1 is turned on by the reference voltage Vref, a Vgs value of the first transistor T1 is equal to a threshold voltage Vth (See Equation 1) of the first transistor T1. Here, the Vgs (See Equation 2) is a value obtained by subtracting the voltage of the second electrode (source electrode) of the first transistor T1 from the voltage of the gate electrode of the first transistor T1, so the voltage value of the second electrode (source electrode) of the first transistor T1 has a lower voltage value (i.e., Vref−Vth) than the voltage of the gate electrode of the first transistor T1 by the threshold voltage Vth of the first transistor T1.

Thereafter, referring to FIG. 2, the second scan signal GC is changed to the gate-off voltage (low level voltage), and then, as the third scan signal GR is also changed to the gate-off voltage (low level voltage), the writing period is entered.

In the writing period, the first scan signal GW of the gate-on voltage (high level voltage) is applied. In this case, the period during which the first scan signal GW is maintained at the gate-on voltage may be 1H. Here, 1H represents one horizontal period, and one horizontal period may correspond to one horizontal synchronizing signal. 1H may mean a time when the gate-on voltage is applied to a scan line of a next row after the gate-on voltage is applied to one scan line. Meanwhile, the second scan signal GC, the third scan signal GR, the first light emitting signal EM1, and the second light emitting signal EM2 of the gate-off voltage (low level voltage) are applied in the writing period.

Figure 5:
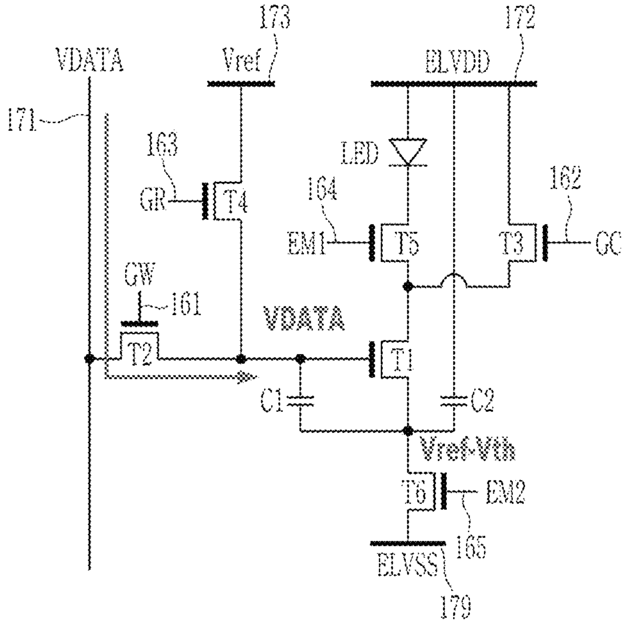

Referring to FIG. 5, in the writing period, the second transistor T2 to which the gate-on voltage (high level voltage) is applied is turned on, and all other transistors are turned off. As a result, the data voltage VDATA enters the pixel to be applied to the gate electrode of the first transistor T1 and the first electrode of the first capacitor C1. In this case, as in the compensation period, the voltage value of the second electrode of the first transistor T1 has a lower voltage value (i.e., Vref−Vth) than the voltage of the gate electrode thereof by the threshold voltage Vth of the first transistor T1.

Meanwhile, the third transistor T3 and the fifth transistor T5 are turned off, so that the first electrode of the first transistor T1 and the first driving voltage line 172 and the light emitting element LED are electrically separated.

Thereafter, referring to FIG. 2, the first light emitting signal EM1 and the second light emitting signal EM2 are changed to the gate-on voltage (high level voltage), and the light emitting period is entered. In this case, the first scan signal GW, the second scan signal GC, and the third scan signal GR of the gate-off voltage (low-level voltage) are applied.

Figure 6:
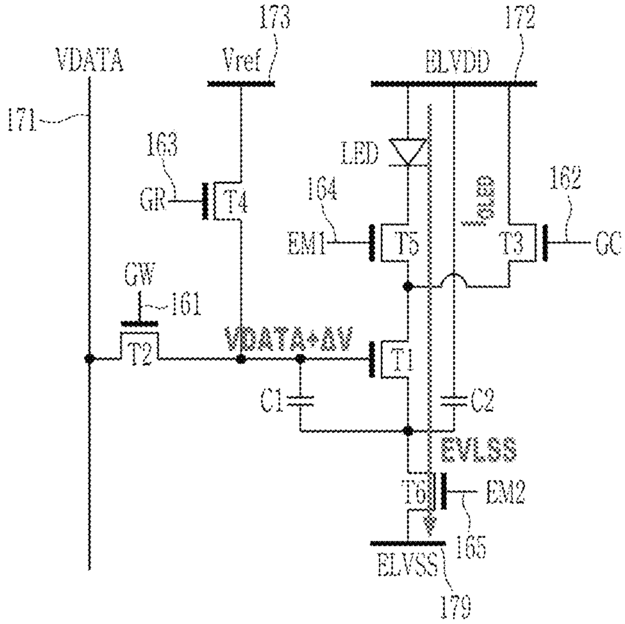

Referring to FIG. 6, the fifth transistor T5 and sixth transistor T6 are turned on by the first light emitting signal EM1 and the second light emitting signal EM2, and a current path connected from the first driving voltage ELVDD through the light emitting element LED, the fifth transistor T5, the first transistor T1, and the sixth transistor T6 to the second driving voltage ELVSS is formed. An amount of a current $I_{OLED}$ flowing along the current path is determined according to a degree at which the first transistor T1 is turned on, and the degree at which the first transistor T1 is turned on is determined according to the data voltage VDATA applied to the gate electrode thereof. The light emitting element LED differently displays brightness according to the amount of the current $I_{LED}$ flowing along the current path.

Comparing FIG. 5 and FIG. 6, it can be seen that the voltage value of the gate electrode is changed by ΔV. The reason the difference in ΔV occurs will be described in detail.

As the light emitting period is entered, the sixth transistor T6 is turned on, and as a result, the voltages of the second electrode of the first capacitor C1 and the second electrode of the first transistor T1 are changed to the second driving voltage ELVSS. When the voltage of the second electrode of the first capacitor C1 is changed, the voltage of the first electrode of the first capacitor C1 is also changed accordingly, so that the voltage change value is indicated as ΔV as shown FIG. 6. The voltage change value ΔV of the first electrode of the first capacitor C1 may be the same as a voltage value of the second electrode of the first capacitor C1.

Referring to FIG. 5, since the voltage value of the second electrode of the first transistor T1 and the second electrode of the first capacitor C1 in the writing period is a value (i.e., Vref−Vth) obtained by subtracting the threshold voltage Vth of the first transistor T1 from the reference voltage Vref, while the writing period is changed to the light emitting period, the change value of the voltage of the second electrode of the first capacitor C1 and the change value ΔV of the voltage of the first electrode of the first capacitor C1 are as in Equation 1 below.

$$\Delta V = V_{ELVSS} - (V_{ref} - V_{th}) \quad \text{(Equation 1)}$$

Here, $V_{ref}$ is a voltage value of the reference voltage Vref, $V_{th}$ is a threshold voltage value of the first transistor T1, and $V_{ELVSS}$ is a voltage value of the second driving voltage ELVSS.

In this case, the current $I_{OLED}$ flowing through the light emitting element LED in the light emitting period may be obtained by the following Equation 2.

$$\begin{aligned} I_{OLED} &= k/2 \times (V_{gs} - V_{th})^2 \quad \text{(Equation 2)} \\ &= k/2 \times [(V_{data} + \Delta V - V_{ELVSS}) - V_{th}]^2 \\ &= k/2 \times [(V_{data} + (V_{ELVSS} - V_{ref} + V_{th}) - V_{th}]^2 \\ &= k/2 \times (V_{data} - V_{ref})^2 \end{aligned}$$

Here, k is a constant value, $V_{data}$ is a voltage value of the data voltage VDATA, $V_{ref}$ is a voltage value of the reference voltage Vref, $V_{th}$ is a threshold voltage value of the first transistor T1, $V_{ELVSS}$ is a voltage value of the second driving voltage ELVSS, Vgs is a voltage difference between the gate electrode and the second electrode of the first transistor T1, and ΔV is the value of Equation 1.

Accordingly, the current $I_{OLED}$ flowing through the light emitting element LED is determined only by the data voltage VDATA and the reference voltage Vref, and has a value independent of the threshold voltage Vth of the first transistor, so that a constant output current $I_{OLED}$ may be generated despite a change in the characteristics of the first transistor T1.

In addition, as the second driving voltage ELVSS is applied in the light emitting period, the voltage change value ΔV generated at the gate electrode is also removed as in Equation 2, so that there is no need to consider it separately, and only the data voltage VDATA and the reference voltage Vref need to be considered, so the current is not changed according to the characteristics of the first transistor T1.

In the above, the voltage value of the first driving voltage ELVDD may be set to be greater than a value obtained by subtracting the threshold voltage value of the first transistor T1 from the voltage value of the reference voltage Vref, and the voltage value of the second driving voltage ELVSS may be set to be smaller than a value obtained by subtracting the threshold voltage value of the first transistor T1 from the voltage value of the reference voltage Vref.

In the above, various driving methods based on the pixel of FIG. 1 have been described.

Hereinafter, a modified embodiment of the pixel of FIG. 1 will be described with reference to FIG. 7 to FIG. 10.

FIG. 7 to FIG. 10 illustrate equivalent circuit diagrams of a modified pixel of the embodiment of FIG. 1.

Hereinafter, portions different from FIG. 1 will be mainly described.

Figure 7:
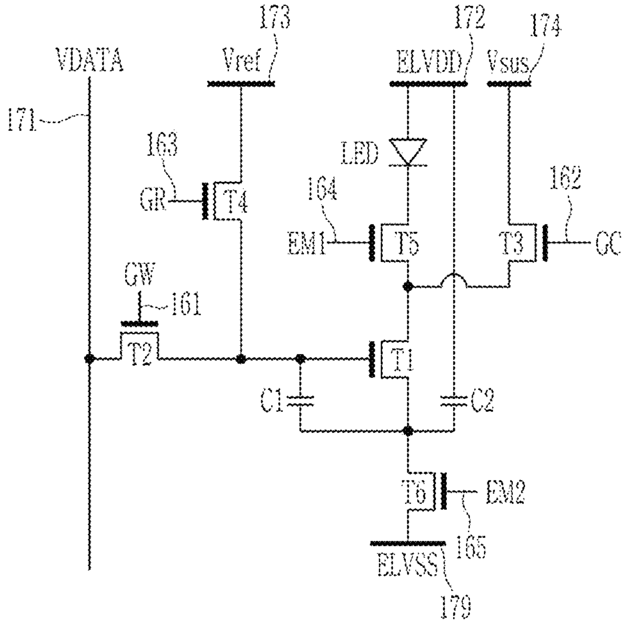
FIG. 7 to FIG. 10 illustrate equivalent circuit diagrams of a modified pixel of the embodiment of FIG. 1.

The embodiment of FIG. 7 differs from the embodiment of FIG. 1 in that the first electrode of the third transistor T3 is not connected to the first driving voltage line 172 but is connected to a sustain voltage line 174 to which a sustain voltage Vsus is applied. Here, the sustain voltage Vsus may have a positive voltage value similar to the first driving voltage ELVDD. In addition, in some embodiments, a bias voltage may be applied instead of the sustain voltage Vsus.

Figure 8:
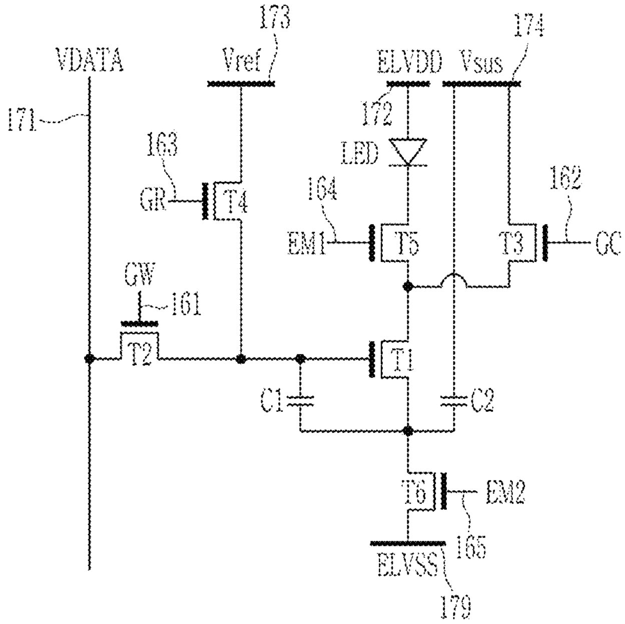

The embodiment of FIG. 8 is an embodiment in which both the first electrode of the third transistor T3 and the first electrode of the second capacitor C2 are connected to the sustain voltage line 174 different from the embodiment of FIG. 7.

Figure 9:
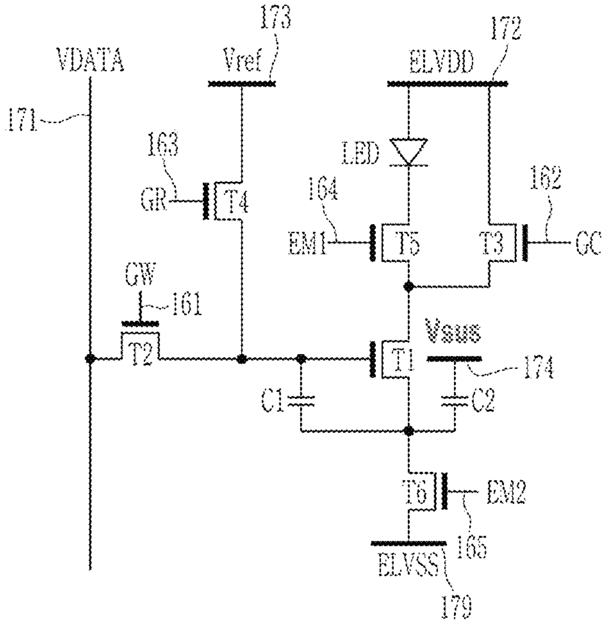

The embodiment of FIG. 9 is an embodiment in which only the first electrode of the second capacitor C2 is connected to the sustain voltage line 174. Meanwhile, in some embodiments, various voltages such as the reference voltage Vref, the second driving voltage ELVSS, or a ground voltage (i.e., 0 V) may be applied to the first electrode of the second capacitor C2.

Figure 10:
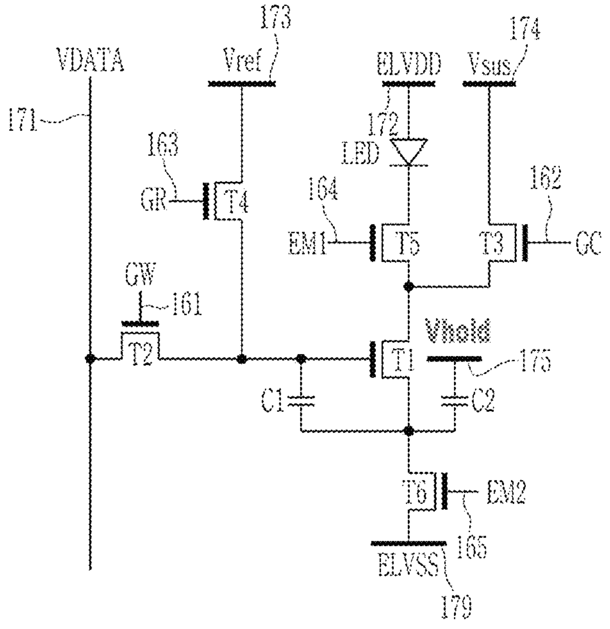

The embodiment of FIG. 10 is an embodiment in which the first electrode of the third transistor T3 is connected to the sustain voltage line 174, and the first electrode of the second capacitor C2 is connected to a hold voltage line 175 to which a hold voltage Vhold is applied. Here, the hold voltage Vhold may have a voltage value between the first driving voltage ELVDD and the second driving voltage ELVSS. Meanwhile, in some embodiments, various voltages such as the reference voltage Vref, the second driving voltage ELVSS, or a ground voltage may be applied to the first electrode of the second capacitor C2 instead of the hold voltage Vhold.

In the modified embodiment of FIG. 7, FIG. 8, and FIG. 10, the voltage value of the sustain voltage Vsus or the bias voltage applied to the first electrode of the third transistor T3 may be set to be greater than a value obtained by subtracting the threshold voltage value Vth of the driving transistor T1 from the voltage value of the reference voltage Vref.

In the above, the pixel circuit of FIG. 1 and the modification thereof have been described in detail.

Hereinafter, a pixel structure according to another embodiment will be described.

Figure 11:
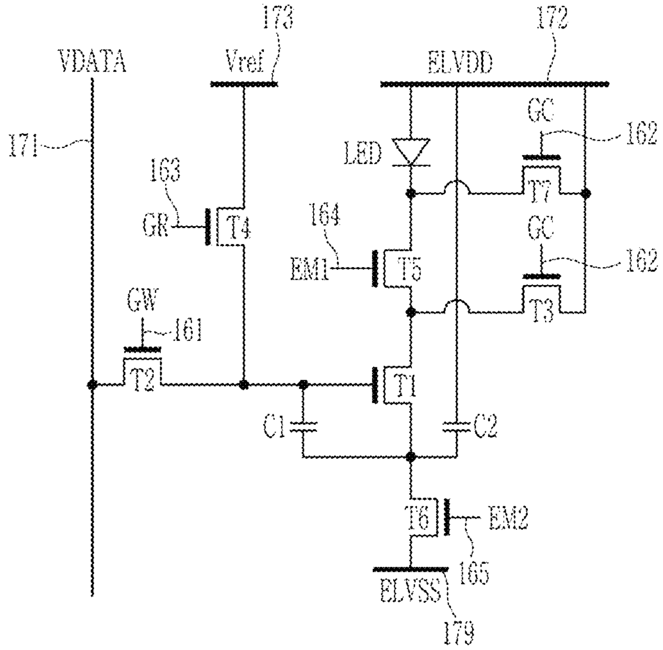
FIG. 11 illustrates an equivalent circuit diagram of one pixel included in a light emitting display device according to another embodiment.

FIG. 11 illustrates an equivalent circuit diagram of one pixel included in a light emitting display device according to another embodiment.

The embodiment of FIG. 11 further includes a seventh transistor T7 in addition to the embodiment of FIG. 1.

The seventh transistor T7 is a transistor, which transmits the first driving voltage ELVDD to the cathode of the light emitting element LED, and the seventh transistor T7 may remove a problem of inability to display black color due to a charge remaining in the cathode of the light emitting element LED and allow to clearly display the black color.

Hereinafter, a structure of the pixel of FIG. 11 will be described in detail as follows.

Referring to FIG. 11, one pixel includes a light emitting element LED and a pixel driving circuit part for driving the same, and the pixel driving circuit part is arranged in a matrix form. The pixel driving circuit part includes all elements except for the light emitting element LED in FIG. 11, and the pixel driving circuit part of the pixel according to the embodiment of FIG. 11 includes a first transistor T1, a second transistor T2, a third transistor T3, a fourth transistor T4, a fifth transistor T5, a sixth transistor T6, a seventh transistor T7, a first capacitor C1, and a second capacitor C2.

In addition, the pixel driving circuit part may be connected to a first scan line 161 to which a first scan signal GW is applied, a second scan line 162 to which a second scan signal GC is applied, a third scan line 163 to which a third scan signal GR is applied, a first light emitting signal line 164 to which a first light emitting signal EM1 is applied, a second light emitting signal line 165 to which a second light emitting signal EM2 is applied, and a data line 171 to which a data voltage VDATA is applied. In addition, the pixel may be connected to a first driving voltage line 172 to which a driving voltage ELVDD (hereinafter referred to as a "first driving voltage") is applied, a second driving voltage line 179 to which a low driving voltage ELVSS (hereinafter referred to as a "second driving voltage") is applied, and a reference voltage line 173 to which a reference voltage Vref is applied.

A circuit structure of the pixel will now be described focusing on respective elements (the transistors, the capacitor, the light emitting element) included in the pixel as follows.

The first transistor T1 includes: a gate electrode, a first electrode (an input side electrode), and a second electrode (an output side electrode). Here, the gate electrode of the first transistor T1 is connected to a first electrode of the first capacitor C1, a second electrode of the second transistor T2, and a second electrode of the fourth transistor T4. The first electrode of the first transistor T1 is connected to a second electrode of the third transistor T3 and a second electrode of the fifth transistor T5. The second electrode of the first transistor T1 is connected to a first electrode of the sixth transistor T6, a second electrode of the first capacitor C1, and a second electrode of the second capacitor C2.

In the first transistor T1, a degree to which the first transistor T1 is turned on is determined according to a voltage of the gate electrode thereof, and an amount of a current flowing from the first electrode to the second electrode of the first transistor T1 according to the turned on degree is determined. The current flowing from the first electrode to the second electrode of the first transistor T1 is the same as a current flowing through the light emitting element LED in a light emitting period, so it may be referred to as a "light emitting current". Here, the first transistor T1 is an n-type transistor, and as a voltage of the gate electrode thereof increases, a large light emitting current may flow. When the light emitting current is large, the light emitting element LED may display high luminance.

The second transistor T2 (hereinafter also referred to as a "data input transistor") includes: a gate electrode connected to the first scan line 161 to which the first scan signal GW is applied; a first electrode (an input-side electrode) connected to the data line 171 to which the data voltage VDATA is applied; and a second electrode (an output-side electrode) connected to the first electrode of the first capacitor C1, the gate electrode of the first transistor T1, and the second electrode of the fourth transistor T4. The second transistor T2 inputs the data voltage VDATA into the pixel according to the first scan signal GW to transmit the data voltage VDATA to the gate electrode of the first transistor T1 and to store the data voltage VDATA in the first electrode of the first capacitor C1.

The third transistor T3 (hereinafter also referred to as a "first voltage transmitting transistor") includes: a gate electrode connected to the second scan line 162 to which the second scan signal GC is applied; a first electrode (an input-side electrode) connected to the first driving voltage line 172; and a second electrode (an output-side electrode) connected to the first electrode of the first transistor T1 and the second electrode of the fifth transistor T5. The third transistor T3 allows the first driving voltage ELVDD to be transmitted to the first transistor T1 without passing through the light emitting element LED. This, since a problem that the light emitting element LED unnecessarily emits light when a current flows through the light emitting element LED may occur, is to transmit the first driving voltage ELVDD to the first transistor T1 through a separate path. Therefore, the third transistor T3 may not be turned on during a light emitting period, and may be turned on during other periods.

The fourth transistor T4 (hereinafter also referred to as a "reference voltage transfer transistor") includes: a gate electrode connected to the third scan line 163 to which the third scan signal GR is applied; a first electrode connected to the reference voltage line 173; and a second electrode connected to the first electrode of the first capacitor, the gate electrode of the first transistor T1, and the second electrode of the second transistor T2. The fourth transistor T4 serves to transmit the reference voltage Vref to the first electrode of the first capacitor C1 and the gate electrode of the first transistor T1 to initialize the first capacitor C1 and the first transistor T1.

The fifth transistor T5 (hereinafter also referred to as a "cathode connecting transistor") includes: a gate electrode connected to the first light emitting signal line 164 to which the first light emitting signal EM1 is applied; a first electrode connected to a cathode of the light emitting element LED; and a second electrode connected to the first electrode of the first transistor T1 and the second electrode of the third transistor T3. The fifth transistor T5 may connect the first electrode of the first transistor T1 and the light emitting element LED based on the first light emitting signal EM1 to form a current path and to allow the light emitting element LED to emit light.

The sixth transistor T6 (hereinafter also referred to as a "low driving voltage applying transistor") includes: a gate electrode connected to the second light emitting signal line 165 to which the second light emitting signal EM2 is applied; a first electrode; and a second electrode for receiving the second driving voltage ELVSS. Here, the first electrode of sixth transistor T6 is connected to the second electrode of the first transistor T1, the second electrode of the first capacitor C1, and the second electrode of the second capacitor C2. The sixth transistor T6 serves to transmit or block the second driving voltage ELVSS from or to the second electrode of the first transistor T1 based on the second light emitting signal EM2.

The seventh transistor T7 (hereinafter also referred to as a "second voltage transmitting transistor") includes: a gate electrode connected to the second scan line 162 to which the second scan signal GC is applied; a first electrode (an input-side electrode) connected to the first driving voltage line 172; and a second electrode (an output-side electrode) connected to the cathode of the light emitting element LED and the first electrode of the fifth transistor T5. The seventh transistor T7 serves to transmit the first driving voltage ELVDD to the cathode of the light emitting element LED, and the seventh transistor T7 may eliminate the problem of failing to display black color due to the charge remaining in the cathode of the light emitting element LED, and makes it possible to clearly display the black color.

In the embodiment of FIG. 11, all the transistors are n-type transistors, and each transistor may be turned on when the voltage of the gate electrode is a high level voltage, and may be turned off when the voltage of the gate electrode is a low level voltage. In addition, a semiconductor layer included in each transistor may use a polycrystalline silicon semiconductor or an oxide semiconductor, and may additionally use an amorphous semiconductor or a single crystal semiconductor.

In some embodiments, the semiconductor layer included in each transistor may further include an overlapping layer (or an additional gate electrode) overlapping the semiconductor layer, and by applying a voltage to the overlapping layer (the additional gate electrode) to change characteristics of the transistor, it is possible to further improve the display quality of the pixel.

The first capacitor C1 includes: a first electrode and a second electrode. Here, the first electrode of the first capacitor C1 is connected to the gate electrode of the first transistor T1, the second electrode of the second transistor T2, and the second electrode of the fourth transistor T4. The second electrode of the first capacitor C1 is connected to the second electrode of the first transistor T1, the first electrode of the sixth transistor T6, and the second electrode of the second capacitor C2. The first electrode of the first capacitor C1 serves to receive the data voltage VDATA from the second transistor T2 to store data voltage VDATA.

The second capacitor C2 includes: a first electrode connected to the first driving voltage line 172; and a second electrode connected to the second electrode of the first transistor T1, the first electrode of the sixth transistor T6, and the second electrode of the first capacitor C1. The second capacitor C2 serves to constantly maintain voltages of the second electrode of the first transistor T1 and the second electrode of the first capacitor C1. Meanwhile, in some embodiments, the second capacitor C2 may be omitted.

The light emitting element LED includes: an anode connected to the first driving voltage line 172 to receive the first driving voltage ELVDD; and a cathode connected to the first electrode of the fifth transistor T5 and the second electrode of the seventh transistor T7. The light emitting element LED is connected to the first transistor T1 through the fifth transistor T5. The light emitting element LED is positioned between the pixel driving circuit part and the first driving voltage line 172, and the same current as the current flowing through the first transistor T1 of the pixel driving circuit part flows in the light emitting element LED, and luminance at which the light emitting element LED emits light may also be determined according to an amount of a corresponding current. The light emitting element LED may include a light emitting layer including at least one of an organic light emitting material and an inorganic light emitting material between the anode and the cathode thereof. A detailed stacked structure of the light emitting element LED according to the embodiment will be described with reference to FIG. 31 and FIG. 32.

The pixel according to the embodiment of FIG. 11 may perform a compensation operation for sensing a change in a characteristic (a threshold voltage) of the first transistor T1 to display constant display luminance regardless of the change in the characteristic (the threshold voltage) of the first transistor T1.

In addition, in FIG. 11, the light emitting element LED is positioned between the first electrode of the first transistor T1 and the first driving voltage line 172. The pixel according to the present embodiment is also referred to as an "inverted pixel" in order to distinguish the inverted pixel from a pixel in which a light emitting element is positioned between the first transistor T1 and the second driving voltage ELVSS. The light emitting element displays luminance according to an amount of a current flowing in a current path connected from the first driving voltage ELVDD to the second driving voltage ELVSS through the first transistor T1, and as the amount of the current increases, the displayed luminance may increase. In the inverted pixel structure of FIG. 11, since the first electrode of the first transistor T1 is connected to the light emitting element LED, and is separated from the second electrode (source electrode) of the first transistor T1, when a voltage of each part of the pixel driving circuit is changed, a voltage of the second electrode (source electrode) of the first transistor T1 may not be changed. More specifically, when the sixth transistor T6 is turned on, as the voltage of the second electrode of the first capacitor C1 decreases, the voltage of the first electrode of the first capacitor C1 also decreases, and due to this, although the output current outputted from the first transistor T1 may also decrease, in the present embodiment, the problem of such a decrease in the output current of the first transistor T1 is eliminated. This will be described in detail with reference to FIG. 12 to FIG. 16.

In the embodiment of FIG. 11, it has been described that one pixel PX includes seven transistors T1 to T7 and two capacitors (the first capacitor C1 and the second capacitor C2), but the present invention is not limited thereto, and in some embodiments, an additional capacitor or transistor may be further included, and some capacitors or transistors may be omitted.

In the above, the circuit structure of the pixel according to the embodiment has been described with reference to FIG. 11.

Hereinafter, a waveform of a signal applied to the pixel of FIG. 11 and an operation of the pixel according to the waveform will be described in detail with reference to FIG. 12 to FIG. 16.

Figure 12:
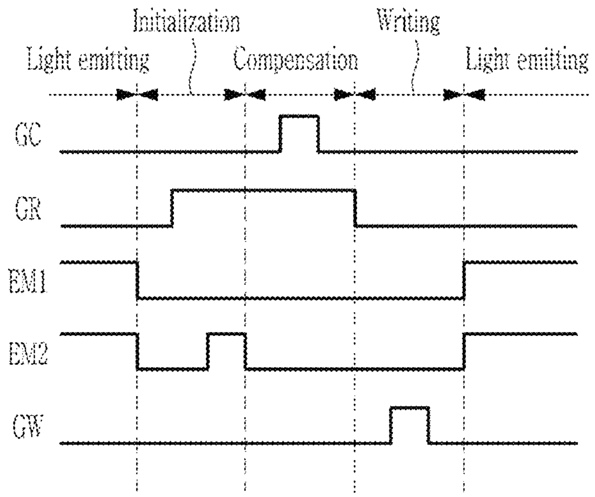
FIG. 12 illustrates a waveform diagram of a signal applied to the pixel of FIG. 11.

FIG. 12 illustrates a waveform diagram of a signal applied to the pixel of FIG. 11, and FIG. 13 to FIG. 16 illustrate drawings for explaining an operation of the pixel of FIG. 11 for each period based on the signal of FIG. 12.

Referring to FIG. 12, when the signal applied to the pixel is divided into periods, it is divided into an initialization period, a compensation period, a writing period, and a light emitting period.

First, the light emitting period is a period in which the light emitting element LED emits light, and the first and second light emitting signals EM1 and EM2 of a gate-on voltage (a high-level voltage) are applied to the fifth transistor T5 and the sixth transistor T6 to be turned on. In this case, the first scan signal GW, the second scan signal GC, and the third scan signal GR of the gate-off voltage (low-level voltage) are applied. As a result, a current path connected from the first driving voltage ELVDD to the second driving voltage ELVSS through the light emitting element LED, the fifth transistor T5, the first transistor T1, and the sixth transistor T6 is formed. An amount of a current flowing through the current path is determined according to a degree at which a channel of the first transistor T1 is turned on, and the degree at which the channel of the first transistor T1 is turned on is determined according to a voltage of the gate electrode of the first transistor T1 (or the first electrode of the first capacitor C1). Accordingly, as the output current generated according to the voltage of the gate electrode of the first transistor T1 flows along the current path including the light emitting element LED, the light emitting element LED emits light. In FIG. 12, the light emitting period in which the light emitting signal of a gate-on voltage (a low level voltage) is applied is hardly illustrated, but in reality, the light emitting period has actually has the longest time. However, since only the above simple operation is performed in the light emitting period, the light emitting period is simply illustrated in FIG. 12.

As the first and second light emitting signals EM1 and EM2 are changed to a gate-off voltage (a low level voltage), the light emitting period ends, and an initialization period is entered.

Referring to FIG. 12, in the initialization period, the third scan signal GR is first changed to a gate-on voltage (a high level voltage), and then the second light emitting signal EM2 is changed to a gate-on voltage (a high level voltage). In this case, the first scan signal GW, the second scan signal GC, and the first light emitting signal EM1 of the gate-off voltage (the low level voltage) are applied.

Figure 13:
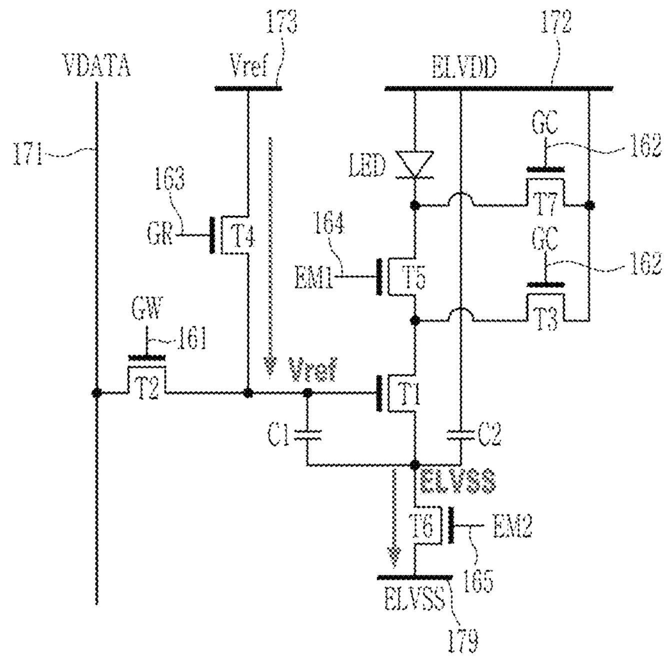
FIG. 13 to FIG. 16 illustrate drawings for explaining an operation of the pixel of FIG. 11 for each period based on the signal of FIG. 12.

Referring to FIG. 13, the fourth transistor T4 connected to the third scan signal GR that is first changed to the gate-on voltage (high level voltage) to be applied is turned on, so that the reference voltage Vref is applied to the gate electrode of the first transistor T1 and the first electrode of the first capacitor C1 to be initialized. Here, the reference voltage Vref may have a voltage value capable of turning on the first transistor T1.

Thereafter, the second light emitting signal EM2 is also applied while being changed to the gate-on voltage (high level voltage) so that the sixth transistor T6 is also turned on, and as a result, the second electrode of the first transistor T1, the second electrode of the first capacitor C1, and the second electrode of the second capacitor C2 are initialized to the second driving voltage ELVSS.

Thereafter, as the second light emitting signal EM2 is changed to the gate-off voltage (low level voltage), the initialization period ends, and the compensation period is entered.

Referring to FIG. 12, in the compensation period, the second scan signal GC is changed to the gate-on voltage (high level voltage) while the third scan signal GR is maintained at the gate-on voltage (high level voltage). In this case, the first scan signal GW, the first light emitting signal EM1, and the second light emitting signal EM2 of the gate-off voltage (the low level voltage) are applied.

Figure 14:
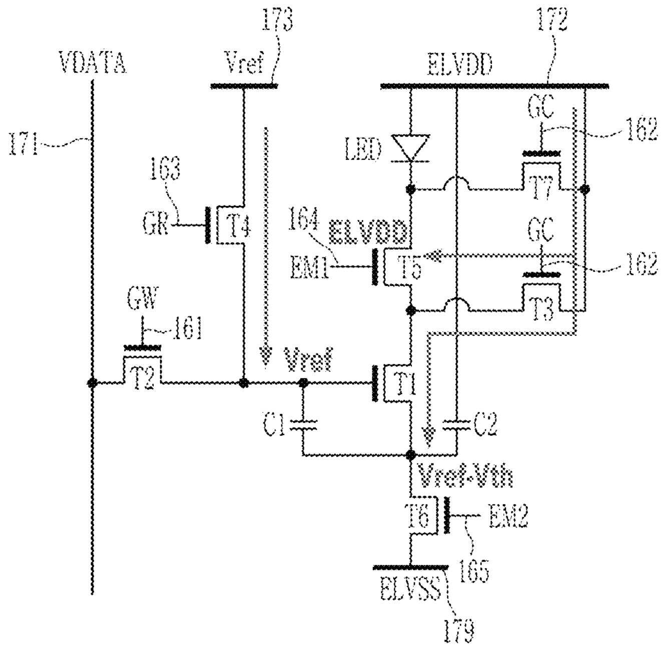

Referring to FIG. 14, while the reference voltage Vref is continuously transmitted to the gate electrode of the first transistor T1 and the first electrode of the first capacitor C1 through the turned-on fourth transistor T4, the third transistor T3 and the seventh transistor T are also turned on by the second scan signal GC of the additionally applied gate-on voltage (high level voltage), and the first driving voltage ELVDD is transmitted to the first electrode of the first transistor T1 and the cathode of the light emitting element LED. In this case, since the first transistor T1 is turned on by the reference voltage Vref, a Vgs value of the first transistor is equal to a threshold voltage Vth of the first transistor T1. Here, the Vgs is a value obtained by subtracting the voltage of the second electrode (source electrode) of the first transistor T1 from the voltage of the gate electrode thereof, so the voltage value of the second electrode (source electrode) of the first transistor T1 has a lower voltage value (i.e., Vref−Vth) than the voltage of the gate electrode thereof by the threshold voltage Vth of the first transistor T1. Meanwhile, the turned-on seventh transistor T7 changes the voltage level of the cathode to the first driving voltage ELVDD, and initializes the voltage of the cathode to the first driving voltage ELVDD, and turned-on seventh transistor T7 removes the charge remaining in the cathode of the light emitting element LED, eliminating the problem of not displaying black color.

Thereafter, referring to FIG. 12, the second scan signal GC is changed to the gate-off voltage (low level voltage), and then, as the third scan signal GR is also changed to the gate-off voltage (low level voltage), the writing period is entered.

In the writing period, the first scan signal GW of the gate-on voltage (high level voltage) is applied. In this case, the period during which the first scan signal GW is maintained at the gate-on voltage may be 1H. Here, 1H represents one horizontal period, and one horizontal period may correspond to one horizontal synchronizing signal. 1H may mean a time when the gate-on voltage is applied to a scan line of a next row after the gate-on voltage is applied to one scan line. Meanwhile, the second scan signal GC, the third scan signal GR, the first light emitting signal EM1, and the second light emitting signal EM2 of the gate-off voltage (low level voltage) are applied in the writing period.

Figure 15:
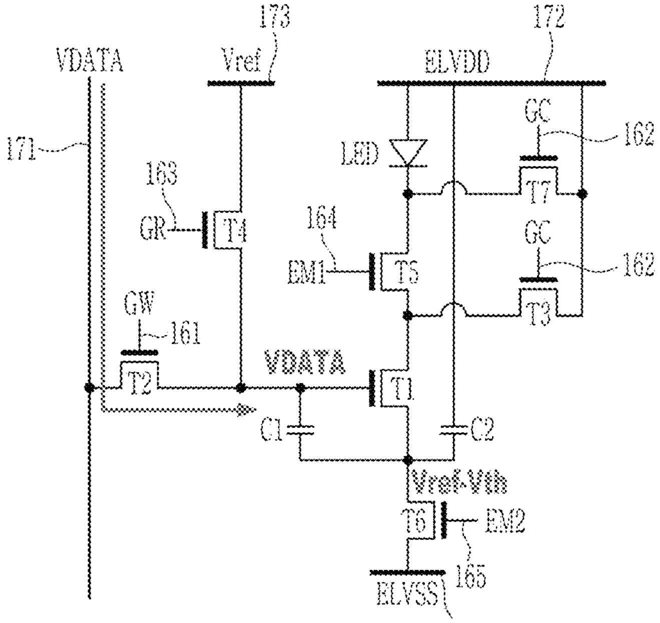

Referring to FIG. 15, in the writing period, the second transistor T2 to which the gate-on voltage (high level voltage) is applied is turned on, and all other transistors are turned off. As a result, the data voltage VDATA enters the pixel to be applied to the gate electrode of the first transistor T1 and the first electrode of the first capacitor C1. In this case, as in the compensation period, the voltage value of the second electrode of the first transistor T1 has a lower voltage value (i.e., Vref−Vth) than the voltage of the gate electrode thereof by the threshold voltage Vth of the first transistor T1.

Meanwhile, the third transistor T3 and fifth transistor T5 are turned off, so that the first electrode of the first transistor T1 and the first driving voltage line 172 and the light emitting element LED are electrically separated.

Thereafter, referring to FIG. 12, the first light emitting signal EM1 and the second light emitting signal EM2 are changed to the gate-on voltage (high level voltage), and the light emitting period is entered. In this case, the first scan signal GW, the second scan signal GC, and the third scan signal GR of the gate-off voltage (low-level voltage) are applied.

Figure 16:
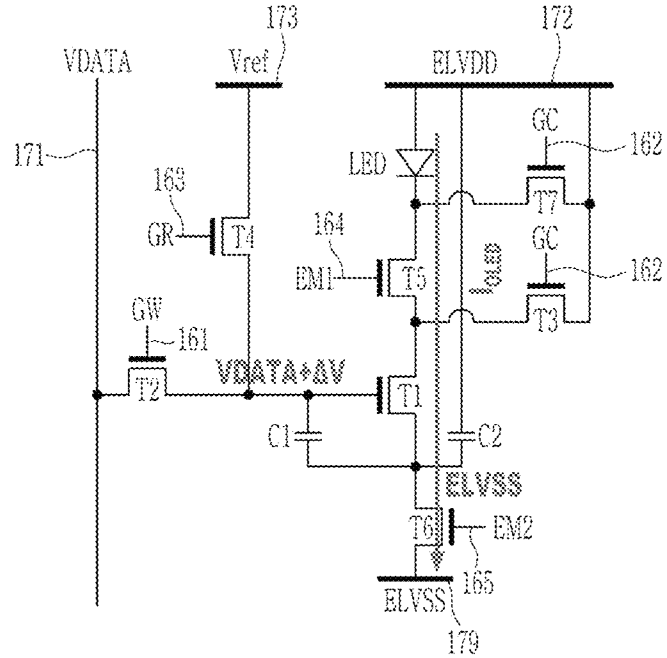

Referring to FIG. 16, the fifth transistor T5 and the sixth transistor T6 are turned on by the first light emitting signal EM1 and the second light emitting signal EM2, and a current path connected from the first driving voltage ELVDD through the light emitting element LED, the fifth transistor T5, the first transistor T1, and the sixth transistor T6 to the second driving voltage ELVSS is formed. An amount of a current $I_{OLED}$ flowing along the current path is determined according to a degree at which the first transistor T1 is turned on, and the degree at which the first transistor T1 is turned on is determined according to the data voltage VDATA applied to the gate electrode thereof. The light emitting element LED differently displays brightness according to the amount of the current $I_{LED}$ flowing along the current path.

Comparing FIG. 15 and FIG. 16, it can be seen that the voltage value of the gate electrode is changed by ΔV. The reason the difference in ΔV occurs will be described in detail.

As the light emitting period is entered, the sixth transistor T6 is turned on, and as a result, the voltages of the second electrode of the first capacitor C1 and the second electrode of the first transistor T1 are changed to the second driving voltage ELVSS. When the voltage of the second electrode of the first capacitor C1 is changed, the voltage of the first electrode of the first capacitor C1 is also changed accordingly, so that the voltage change value is indicated as ΔV as shown FIG. 6. The voltage change value ΔV of the first electrode of the first capacitor C1 may be the same as a voltage value of the second electrode of the first capacitor C1.

Referring to FIG. 15, since the voltage value of the second electrode of the first transistor T1 and the second electrode of the first capacitor C1 in the writing period is a value (i.e., Vref−Vth) obtained by subtracting the threshold voltage Vth of the first transistor T1 from the reference voltage Vref, while the writing period is changed to the light emitting period, the change value of the voltage of the second electrode of the first capacitor C1 and the change value ΔV of the voltage of the first electrode of the first capacitor C1 are as in Equation 3 below.

$$\Delta V = V_{ELVSS} - (V_{ef} - V_{th}) \quad \text{(Equation 3)}$$

Here, $V_{ref}$ is a voltage value of the reference voltage Vref, $V_{th}$ is a threshold voltage value of the first transistor T1, and $V_{ELVSS}$ is a voltage value of the second driving voltage ELVSS.

In this case, the current $I_{OLED}$ flowing through the light emitting element LED in the light emitting period may be obtained by the following Equation 4 below.

$$\begin{aligned} I_{OLED} &= k/2 \times (V_{gs} - V_{th})^2 \quad \text{(Equation 4)} \\ &= k/2 \times [(V_{data} + \Delta V - V_{ELVSS}) - V_{th}]^2 \\ &= k/2 \times [(V_{data} + (V_{ELVSS} - V_{ref} + V_{th}) - V_{ELVSS}) - V_{th}]^2 \\ &= k/2 \times (V_{data} - V_{ref})^2 \end{aligned}$$

Here, k is a constant value, $V_{data}$ is a voltage value of the data voltage VDATA, $V_{ref}$ is a voltage value of the reference voltage Vref, $V_{th}$ is a threshold voltage value of the first transistor T1, $V_{ELVSS}$ is a voltage value of the second driving voltage ELVSS, Vgs is a voltage difference between the gate electrode and the second electrode of the first transistor T1, and ΔV is the value of Equation 1.

Accordingly, the current $I_{OLED}$ flowing through the light emitting element LED is determined only by the data voltage VDATA and the reference voltage Vref, and has a value independent of the threshold voltage Vth of the first transistor T1, so that a constant output current $I_{OLED}$ may be generated despite a change in the characteristics of the first transistor T1.

In addition, as the second driving voltage ELVSS is applied in the light emitting period, the voltage change value ΔV generated at the gate electrode is also removed as in Equation 4, so that there is no need to consider it separately, and only the data voltage VDATA and the reference voltage Vref need to be considered, so the current is not changed according to the characteristics of the first transistor T1.

In the above, the voltage value of the first driving voltage ELVDD may be set to be greater than a value obtained by subtracting the threshold voltage value of the first transistor T1 from the voltage value of the reference voltage Vref, and the voltage value of the second driving voltage ELVSS may be set to be smaller than a value obtained by subtracting the threshold voltage value of the first transistor T1 from the voltage value of the reference voltage Vref.

In the above, various driving methods based on the pixel of FIG. 11 have been described.

Hereinafter, a modified embodiment of the pixel of FIG. 11 will be described with reference to FIG. 17 to FIG. 20.

FIG. 17 to FIG. 20 illustrate equivalent circuit diagrams of a modified pixel of the embodiment of FIG. 11.

Hereinafter, portions different from FIG. 11 will be mainly described.

Figure 17:
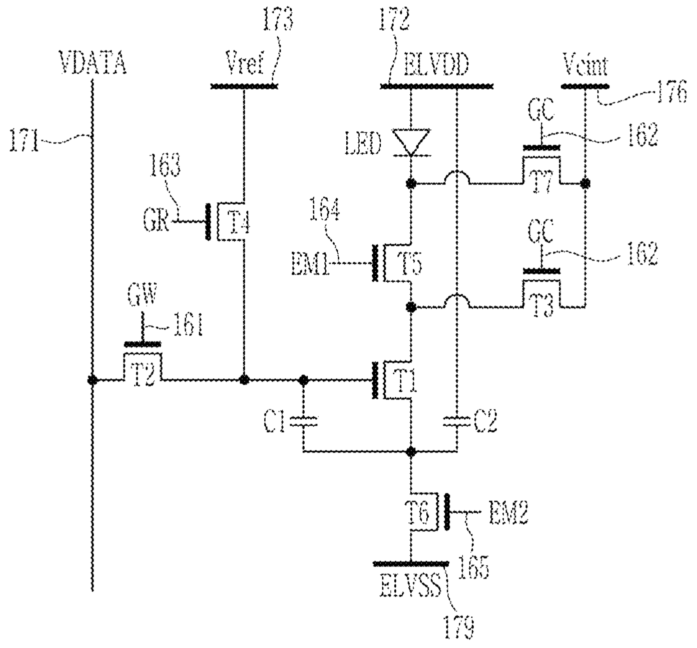
FIG. 17 to FIG. 20 illustrate equivalent circuit diagrams of a modified pixel of the embodiment of FIG. 11.

The embodiment of FIG. 17 differs from the embodiment of FIG. 11 in that the first electrodes of the third transistor T3 and the seventh transistor T7 are not connected to the first driving voltage line 172 but are connected to an additional initialization voltage line 176 to which an additional initialization voltage Vcint is applied. Here, the additional initialization voltage Vcint may have a positive voltage value similar to the first driving voltage ELVDD. In addition, in some embodiments, a bias voltage may be applied instead of the additional initialization voltage Vcint.

Figure 18:
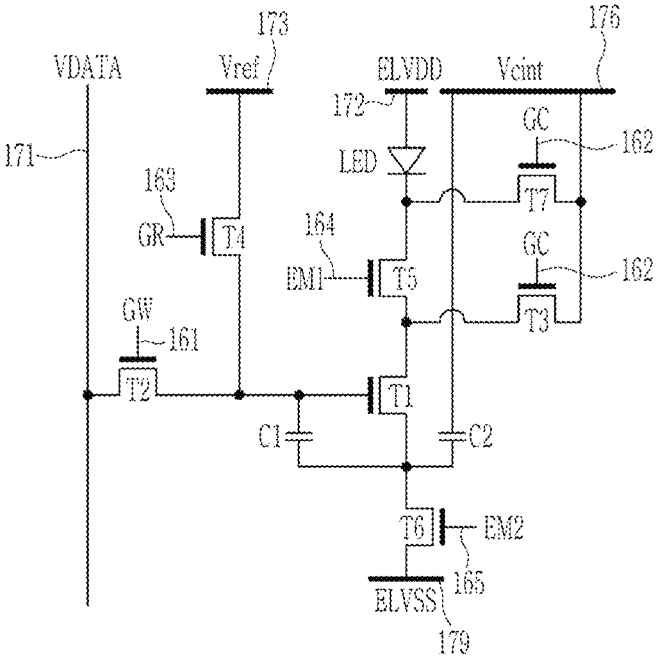

The embodiment of FIG. 18 is an embodiment in which all the first electrodes of the third transistor T3 and the seventh transistor T7 and the first electrode of the second capacitor C2 are connected to the additional initialization voltage line 176, different from the embodiment of FIG. 17.

Figure 19:
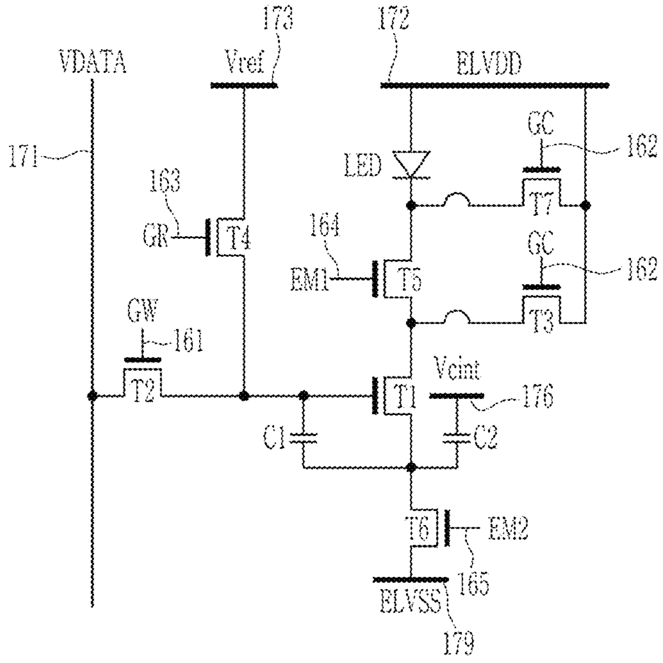

The embodiment of FIG. 19 is an embodiment in which only the first electrode of the second capacitor C2 is connected to the additional initialization voltage line 176, unlike the embodiment of FIG. 11. Meanwhile, in some embodiments, various voltages such as the reference voltage Vref, the second driving voltage ELVSS, or a ground voltage may be applied to the first electrode of the second capacitor C2.

Figure 20:
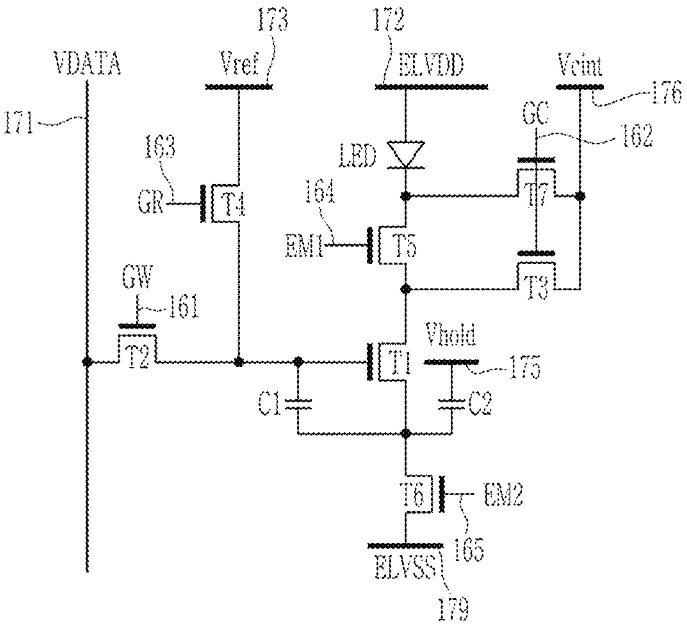

The embodiment of FIG. 20 is an embodiment in which the first electrodes of the third transistor T3 and the seventh transistor T7 are connected to the additional initialization voltage line 176, and the first electrode of the second capacitor C2 is connected to a hold voltage line 175 to which a hold voltage Vhold is applied. Here, the hold voltage Vhold may have a voltage value between the first driving voltage ELVDD and the second driving voltage ELVSS. Meanwhile, in some embodiments, various voltages such as the reference voltage Vref, the second driving voltage ELVSS, or a ground voltage may be applied to the first electrode of the second capacitor C2 instead of the hold voltage Vhold.

Meanwhile, in the modified embodiment of FIG. 17, FIG. 18, and FIG. 20, the voltage value of the additional initialization voltage Vcint or the bias voltage applied to the first electrode of the third transistor T3 may be set to be greater than a value obtained by subtracting the threshold voltage value Vth of the driving transistor T1 from the voltage value of the reference voltage Vref.

In the above, the structure and operation of the pixel circuit of FIG. 11 and the modified circuit structure of the pixel of FIG. 11 have been described.

Hereinafter, a pixel structure according to another embodiment will be described.

Figure 21:
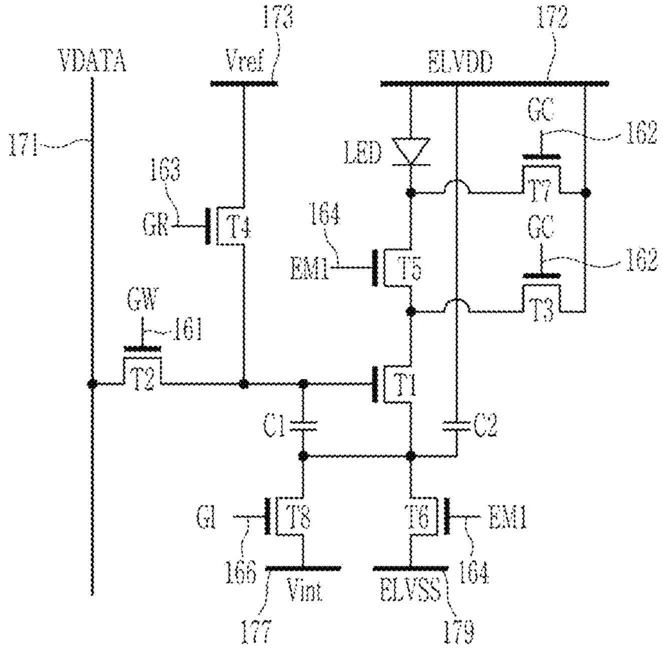
FIG. 21 illustrates an equivalent circuit diagram of one pixel included in a light emitting display device according to another embodiment.

FIG. 21 illustrates an equivalent circuit diagram of one pixel included in a light emitting display device according to another embodiment.

The embodiment of FIG. 21 further includes an eighth transistor T8 (hereinafter also referred to as an "initialization voltage transmitting transistor") in addition to the embodiment of FIG. 11.

The eighth transistor T8 is a transistor, which transmits the initialization voltage Vint to the second electrode of the first transistor T1, the first electrode of the seventh transistor T7, the second electrode of the first capacitor C1, and the second electrode of the second capacitor C2, and the eighth transistor T8 is a transistor, which changes the voltage of each electrode above to the initialization voltage Vint to initialize the first capacitor C1, the second capacitor C2, the first transistor T1, and the seventh transistor T7.

In addition, the pixel according to the embodiment of FIG. 21 does not include the second light emitting signal line 165 to which the second light emitting signal EM2 is applied, but includes only the first light emitting signal line 164 to which the first light emitting signal EM1 is applied to the gate electrode of the sixth transistor T6.

Hereinafter, a structure of the pixel of FIG. 21 will be described in detail.

Referring to FIG. 21, one pixel includes a light emitting element LED and a pixel driving circuit part for driving the same, and the pixel driving circuit part is arranged in a matrix form. The pixel driving circuit part includes all elements except for the light emitting element LED in FIG. 21, and the pixel driving circuit part of the pixel according to the embodiment of FIG. 11 includes a first transistor T1, a second transistor T2, a third transistor T3, a fourth transistor T4, a fifth transistor T5, a sixth transistor T6, a seventh transistor T7, an eighth transistor T8, a first capacitor C1, and a second capacitor C2.

In addition, the pixel driving circuit part may be connected to a first scan line 161 to which a first scan signal GW is applied, a second scan line 162 to which a second scan signal GC is applied, a third scan line 163 to which a third scan signal GR is applied, a fourth scan line 166 to which a fourth scan signal GI is applied, a first light emitting signal line 164 to which a first light emitting signal EM1 is applied, and a data line 171 to which a data voltage VDATA is applied. In addition, the pixel may be connected to a first driving voltage line 172 to which a high driving voltage ELVDD (hereinafter referred to as a "first driving voltage") is applied, a second driving voltage line 179 to which a low driving voltage ELVSS (hereinafter referred to as a "second driving voltage") is applied, a reference voltage line 173 to which a reference voltage Vref is applied, and an initialization voltage line 177 to which an initialization voltage Vint is applied.

A circuit structure of the pixel will now be described focusing on respective elements (the transistors, the capacitor, and the light emitting element) included in the pixel as follows.

The first transistor T1 includes: a gate electrode, a first electrode (an input side electrode) and a second electrode (an output side electrode). Here, the gate electrode of the first transistor T1 is connected to a first electrode of the first capacitor C1, a second electrode of the second transistor T2, and a second electrode of the fourth transistor T4. The first electrode of the first transistor T1 is connected to a second electrode of the third transistor T3 and a second electrode of the fifth transistor T5. The second electrode of the first transistor T1 is connected to a first electrode of the sixth transistor T6, a second electrode of the eighth transistor T8, a second electrode of the first capacitor C1, and a second electrode of the second capacitor C2.

In the first transistor T1, a degree to which the first transistor T1 is turned on is determined according to a voltage of the gate electrode thereof, and an amount of a current flowing from the first electrode to the second electrode of the first transistor T1 according to the turned on degree is determined. The current flowing from the first electrode to the second electrode of the first transistor T1 is the same as a current flowing through the light emitting element LED in a light emitting period, so it may be referred to as a "light emitting current". Here, the first transistor T1 is an n-type transistor, and as a voltage of the gate electrode thereof increases, a large light emitting current may flow. When the light emitting current is large, the light emitting element LED may display high luminance.

The second transistor T2 (hereinafter also referred to as a "data input transistor") includes: a gate electrode connected to the first scan line 161 to which the first scan signal GW is applied; a first electrode (an input-side electrode) connected to the data line 171 to which the data voltage VDATA is applied; and a second electrode (an output-side electrode) connected to the first electrode of the first capacitor C1, the gate electrode of the first transistor T1, and the second electrode of the fourth transistor T4. The second transistor T2 inputs the data voltage VDATA into the pixel according to the first scan signal GW to transmit the data voltage VDATA to the gate electrode of the first transistor T1 and to store the data voltage VDATA in the first electrode of the first capacitor C1.

The third transistor T3 (hereinafter also referred to as a "first voltage transmitting transistor") includes: a gate electrode connected to the second scan line 162 to which the second scan signal GC is applied; a first electrode (an input-side electrode) connected to the first driving voltage line 172; and a second electrode (an output-side electrode) connected to the first electrode of the first transistor T1 and the second electrode of the fifth transistor T5. The third transistor T3 allows the first driving voltage ELVDD to be transmitted to the first transistor T1 without passing through the light emitting element LED. This, since a problem that the light emitting element LED unnecessarily emits light when a current flows through the light emitting element LED may occur, is to transmit the first driving voltage ELVDD to the first transistor T1 through a separate path. Therefore, the third transistor T3 may not be turned on during a light emitting period, and may be turned on during other periods.

The fourth transistor T4 (hereinafter also referred to as a "reference voltage transfer transistor") includes: a gate electrode connected to the third scan line 163 to which the third scan signal GR is applied; a first electrode connected to the reference voltage line 173; and a second electrode connected to the first electrode of the first capacitor, the gate electrode of the first transistor T1, and the second electrode of the second transistor T2. The fourth transistor T4 serves to transmit the reference voltage Vref to the first electrode of the first capacitor C1 and the gate electrode of the first transistor T1 to initialize the first capacitor C1, and the first transistor T1.

The fifth transistor T5 (hereinafter also referred to as a "cathode connecting transistor") includes: a gate electrode connected to the first light emitting signal line 164 to which the first light emitting signal EM1 is applied; a first electrode connected to a cathode of the light emitting element LED; and a second electrode connected to the first electrode of the first transistor T1 and the second electrode of the third transistor T3. The fifth transistor T5 may connect the first electrode of the first transistor T1 and the light emitting element LED based on the first light emitting signal EM1 to form a current path and to allow the light emitting element LED to emit light.

The sixth transistor T6 (hereinafter also referred to as a "low driving voltage applying transistor") includes: a gate electrode connected to the first light emitting signal line 164 to which the first light emitting signal EM1 is applied; a first electrode; and a second electrode for receiving the second driving voltage ELVSS. Here, the first electrode of sixth transistor T6 is connected to the second electrode of the first transistor T1, the second electrode of the first capacitor C1, and the second electrode of the second capacitor C2. The sixth transistor T6 serves to transmit or block the second driving voltage ELVSS to the second electrode of the first transistor T1 based on the first light emitting signal EM1.

The seventh transistor T7 (hereinafter also referred to as a "second voltage transmitting transistor") includes: a gate electrode connected to the second scan line 162 to which the second scan signal GC is applied; a first electrode (an input-side electrode) connected to the first driving voltage line 172; and a second electrode (an output-side electrode) connected to the cathode of the light emitting element LED and the first electrode of the fifth transistor T5. The seventh transistor T7 serves to transmit the first driving voltage ELVDD to the cathode of the light emitting element LED, and the seventh transistor T7 may eliminate the problem of failing to display black color due to the charge remaining in the cathode of the light emitting element LED, and makes it possible to clearly display the black color.

The eighth transistor T8 (hereinafter also referred to as an "initialization voltage transmitting transistor") includes: a gate electrode connected to the fourth scan line 166 to which the fourth scan signal GI is applied; a first electrode (an input-side electrode) connected to the initialization voltage line 177; and a second electrode (an output-side electrode) connected to the second electrode of the first transistor T1, the first electrode of the sixth transistor T6, the second electrode of the first capacitor C1, and the second electrode of the second capacitor C2. The eighth transistor T8 serves to transmit the initialization voltage Vint to the second electrode of the first transistor T1, the first electrode of the sixth transistor T6, the second electrode of the first capacitor C1, and the second electrode of the second capacitor C2 to initialize the first capacitor C1, the second capacitor C2, the first transistor T1, and the sixth transistor T6.

In the embodiment of FIG. 21, all the transistors are n-type transistors, and each transistor may be turned on when the voltage of the gate electrode is a high level voltage, and may be turned off when the voltage of the gate electrode is a low level voltage. In addition, a semiconductor layer included in each transistor may use a polycrystalline silicon semiconductor or an oxide semiconductor, and may additionally use an amorphous semiconductor or a single crystal semiconductor.

In some embodiments, the semiconductor layer included in each transistor may further include an overlapping layer (or an additional gate electrode) overlapping the semiconductor layer, and by applying a voltage to the overlapping layer (the additional gate electrode) to change characteristics of the transistor, it is possible to further improve the display quality of the pixel.

The first capacitor C1 includes: a first electrode and a second electrode. Here, the first electrode of the first capacitor C1 is connected to the gate electrode of the first transistor T1, the second electrode of the second transistor T2, and the second electrode of the fourth transistor T4. The second electrode of the first capacitor C1 is connected to the second electrode of the first transistor T1, the first electrode of the sixth transistor T6, the second electrode of the eighth transistor T8, and the second electrode of the second capacitor C2. The first electrode of the first capacitor C1 serves to receive the data voltage VDATA from the second transistor T2 to store the data voltage VDATA.

The second capacitor C2 includes: a first electrode connected to the first driving voltage line 172; and a second electrode connected to the second electrode of the first transistor T1, the first electrode of the sixth transistor T6, the second electrode of the eighth transistor T8, and the second electrode of the first capacitor C1. The second capacitor C2 serves to constantly maintain voltages of the second electrode of the first transistor T1 and the second electrode of the first capacitor C1. Meanwhile, in some embodiments, the second capacitor C2 may be omitted.

The light emitting element LED includes: an anode connected to the first driving voltage line 172 to receive the first driving voltage ELVDD; and a cathode connected to the first electrode of the fifth transistor T5 and the second electrode of the seventh transistor T7. The cathode of the light emitting element LED is connected to the first transistor T1 through the fifth transistor T5. The light emitting element LED is positioned between the pixel driving circuit part and the first driving voltage line 172, and the same current as the current flowing through the first transistor T1 of the pixel driving circuit part flows in the light emitting element LED, and luminance at which the light emitting element LED emits light may also be determined according to an amount of a corresponding current. The light emitting element LED may include a light emitting layer including at least one of an organic light emitting material and an inorganic light emitting material between the anode and the cathode thereof. A detailed stacked structure of the light emitting element LED according to the embodiment will be described with reference to FIG. 31 and FIG. 32.

The pixel according to the embodiment of FIG. 21 may perform a compensation operation for sensing a change in a characteristic (a threshold voltage) of the first transistor T1 to display constant display luminance regardless of the change in the characteristic (the threshold voltage) of the first transistor T1.

In addition, in FIG. 21, the light emitting element LED is positioned between the first electrode of the first transistor T1 and the first driving voltage line 172. The pixel according to the present embodiment is also referred to as an "inverted pixel" in order to distinguish the inverted pixel from a pixel in which a light emitting element is positioned between the first transistor T1 and the second driving voltage ELVSS. The light emitting element displays luminance according to an amount of a current flowing in a current path connected from the first driving voltage ELVDD to the second driving voltage ELVSS through the first transistor T1, and as the amount of the current increases, the displayed luminance may increase. In the inverted pixel structure of FIG. 21, since the first electrode of the first transistor T1 is connected to the light emitting element LED, and is separated from the second electrode (source electrode) of the first transistor T1, when a voltage of each part of the pixel driving circuit is changed, a voltage of the second electrode (source electrode) of the first transistor T1 may not be changed. More specifically, when the sixth transistor T6 is turned on, as the voltage of the second electrode of the first capacitor C1 decreases, the voltage of the first electrode of the first capacitor C1 also decreases, and due to this, although the output current outputted from the first transistor T1 may also decrease, in the present embodiment, the problem of such a decrease in the output current of the first transistor T1 is eliminated. This will be described in detail with reference to FIG. 22 to FIG. 26.

In the embodiment of FIG. 21, it has been described that one pixel PX includes eight transistors T1 to T8 and two capacitors (the first capacitor C1 and the second capacitor C2), but the present invention is not limited thereto, and in some embodiments, an additional capacitor or transistor may be further included, and some capacitors or transistors may be omitted.

In the above, the circuit structure of the pixel according to the embodiment has been described with reference to FIG. 21.

Hereinafter, a waveform of a signal applied to the pixel of FIG. 11 and an operation of the pixel according to the waveform will be described in detail with reference to FIG. 22 to FIG. 26.

Figure 22:
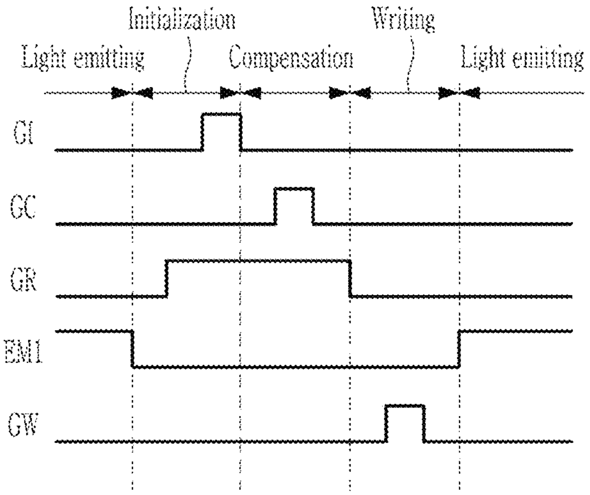
FIG. 22 illustrates a waveform diagram of a signal applied to the pixel of FIG. 21.

FIG. 22 illustrates a waveform diagram of a signal applied to the pixel of FIG. 21, and FIG. 23 to FIG. 26 illustrate drawings for explaining an operation of the pixel of FIG. 21 for each period based on the signal of FIG. 22.

Referring to FIG. 22, when the signal applied to the pixel is divided into periods, it is divided into an initialization period, a compensation period, a writing period, and a light emitting period.

First, the light emitting period is a period in which the light emitting element LED emits light, and the first light emitting signal EM1 of a gate-on voltage (a high-level voltage) is applied to the fifth transistor T5 and the sixth transistor T6 to be turned on. In this case, the first scan signal GW, the second scan signal GC, the third scan signal GR, and the fourth scan signal GI of the gate-off voltage (low-level voltage) are applied. As a result, a current path connected from the first driving voltage ELVDD to the second driving voltage ELVSS through the light emitting element LED, the fifth transistor T5, the first transistor T1, and the sixth transistor T6 is formed. An amount of a current flowing through the current path is determined according to a degree at which a channel of the first transistor T1 is turned on, and the degree at which the channel of the first transistor T1 is turned on is determined according to a voltage of the gate electrode of the first transistor T1 (or the first electrode of the first capacitor C1). Accordingly, as the output current generated according to the voltage of the gate electrode of the first transistor T1 flows along the current path including the light emitting element LED, the light emitting element LED emits light. In FIG. 22, the light emitting period in which the light emitting signal of a gate-on voltage (a low level voltage) is applied is hardly illustrated, but in reality, the light emitting period actually has the longest time. However, since only the above simple operation is performed in the light emitting period, the light emitting period is simply illustrated in FIG. 22.

As the first light emitting signal EM1 is changed to a gate-off voltage (a low level voltage), the light emitting period ends, and an initialization period is entered.

Referring to FIG. 22, in the initialization period, the third scan signal GR is first changed to a gate-on voltage (a high level voltage), and then the fourth scan signal GI is changed to a gate-on voltage (a high level voltage). In this case, the first scan signal GW, the second scan signal GC, and the first light emitting signal EM1 of the gate-off voltage (the low level voltage) are applied.

Figure 23:
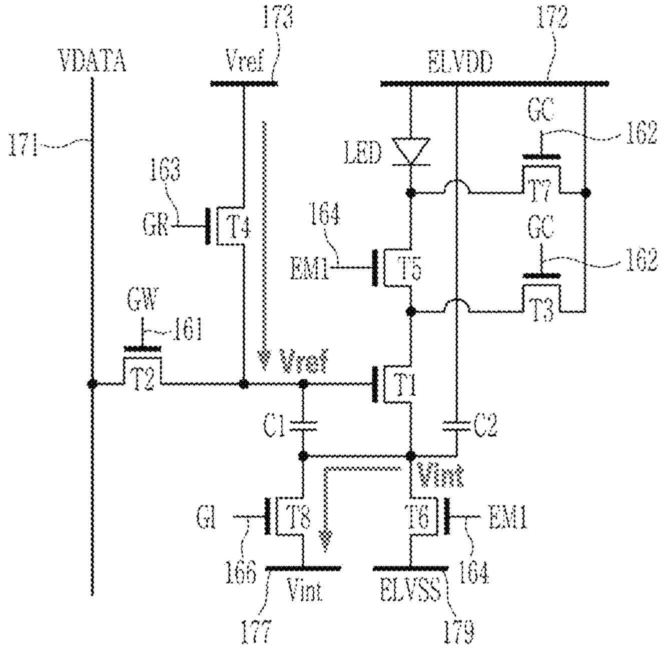
FIG. 23 to FIG. 26 illustrate drawings for explaining an operation of the pixel of FIG. 21 for each period based on the signal of FIG. 22.

Referring to FIG. 23, the fourth transistor T4 connected to the third scan signal GR that is first changed to the gate-on voltage (high level voltage) to be applied is turned on, so that the reference voltage Vref is applied to the gate electrode of the first transistor T1 and the first electrode of the first capacitor C1 to be initialized. Here, the reference voltage Vref may have a voltage value capable of turning on the first transistor T1.

Thereafter, the fourth scan signal EM2 is also applied while being changed to the gate-on voltage (high level voltage) so that the eighth transistor T8 is also turned on, and as a result, the second electrode of the first transistor T1, the second electrode of the sixth transistor T6, the second electrode of the first capacitor C1, and the second electrode of the second capacitor C2 are initialized to the initialization voltage Vint.

Thereafter, as the fourth scan signal GI is changed to the gate-off voltage (low level voltage), the initialization period ends, and the compensation period is entered.

Referring to FIG. 22, in the compensation period, the second scan signal GC is changed to the gate-on voltage (high level voltage) while the third scan signal GR is maintained at the gate-on voltage (high level voltage). In this case, the first scan signal GW, the fourth scan signal GI, and the first light emitting signal EM1 of the gate-off voltage (the low level voltage) are applied.

Figure 24:
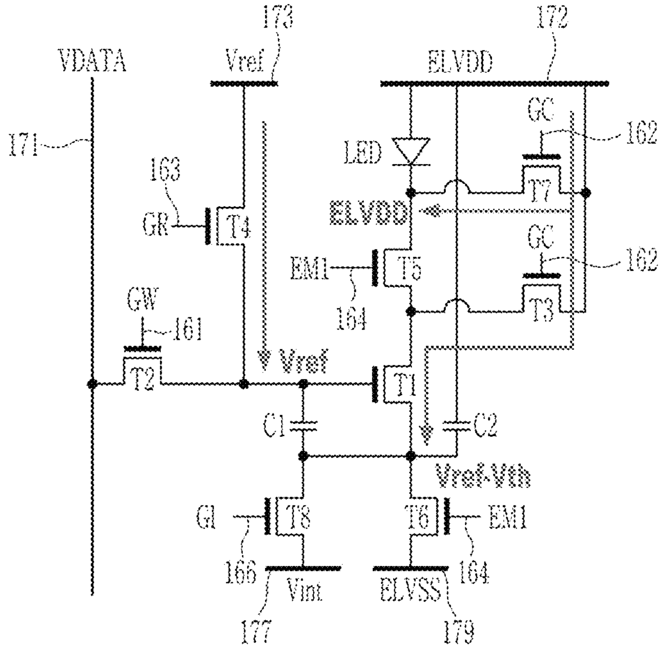

Referring to FIG. 24, while the reference voltage Vref is continuously transmitted to the gate electrode of the first transistor T1 and the first electrode of the first capacitor C1 through the turned-on fourth transistor T4, the third transistor T3 and the seventh transistor T are also turned on by the second scan signal GC of the additionally applied gate-on voltage (high level voltage), and the first driving voltage ELVDD is transmitted to the first electrode of the first transistor T1 and the cathode of the light emitting element LED. In this case, since the first transistor T1 is turned on by the reference voltage Vref, a Vgs value of the first transistor is equal to a threshold voltage Vth of the first transistor T1. Here, the Vgs is a value obtained by subtracting the voltage of the second electrode (source electrode) of the first transistor T1 from the voltage of the gate electrode thereof, so the voltage value of the second electrode (source electrode) of the first transistor T1 has a lower voltage value (i.e., Vref−Vth) than the voltage of the gate electrode thereof by the threshold voltage Vth of the first transistor T1. Meanwhile, the turned-on seventh transistor T7 changes the voltage level of the cathode of the light emitting element LED to the first driving voltage ELVDD, and initializes the voltage of the cathode of the light emitting element LED to the first driving voltage ELVDD, and the turned-on seventh transistor T7 removes the charge remaining in the cathode of the light emitting element LED, eliminating the problem of not displaying black color.

Thereafter, referring to FIG. 22, the second scan signal GC is changed to the gate-off voltage (low level voltage), and then, as the third scan signal GR is also changed to the gate-off voltage (low level voltage), the writing period is entered.

In the writing period, the first scan signal GW of the gate-on voltage (high level voltage) is applied. In this case, the period during which the first scan signal GW is maintained at the gate-on voltage may be 1H. Here, 1H represents one horizontal period, and one horizontal period may correspond to one horizontal synchronizing signal. 1H may mean a time when the gate-on voltage is applied to a scan line of a next row after the gate-on voltage is applied to one scan line. Meanwhile, the second scan signal GC, the third scan signal GR, the first light emitting signal EM1, and the first light emitting signal EM1 of the gate-off voltage (low level voltage) are applied in the writing period.

Figure 25:
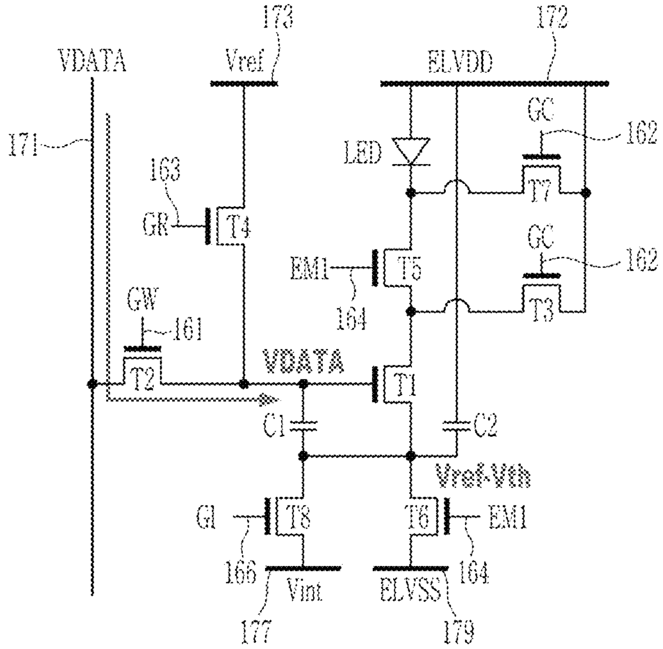

Referring to FIG. 25, in the writing period, the second transistor T2 to which the gate-on voltage (high level voltage) is applied is turned on, and all other transistors are turned off. As a result, the data voltage VDATA is entered to the pixel to be applied to the gate electrode of the first transistor T1 and the first electrode of the first capacitor C1. In this case, as in the compensation period, the voltage value of the second electrode of the first transistor T1 has a lower voltage value (i.e., Vref−Vth) than the voltage of the gate electrode thereof by the threshold voltage Vth of the first transistor T1.

Meanwhile, the third transistor T3 and the fifth transistor T5 are turned off, so that the first electrode of the first transistor T1 and the first driving voltage line 172 and the light emitting element LED are electrically separated.

Thereafter, referring to FIG. 22, the first light emitting signal EM1 is changed to the gate-on voltage (high level voltage), and the light emitting period is entered. In this case, the first scan signal GW, the second scan signal GC, the third scan signal GR, and the fourth scan signal GI of the gate-off voltage (low-level voltage) are applied.

Figure 26:
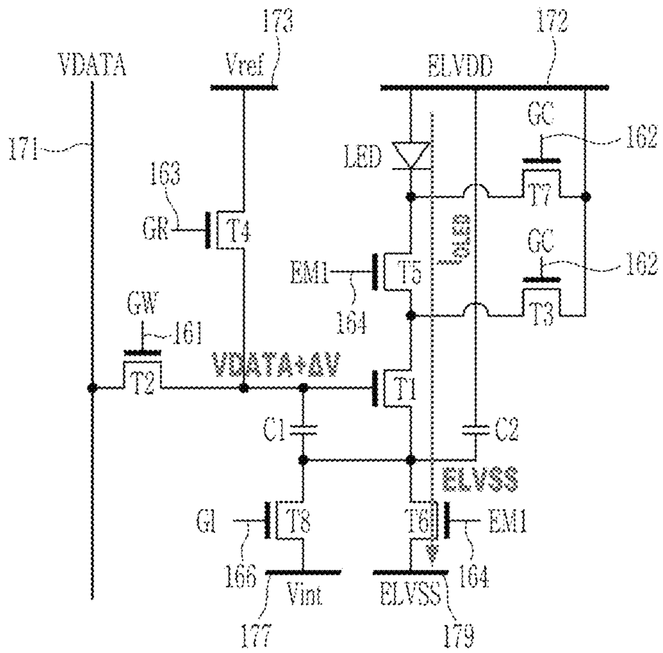

Referring to FIG. 26, the fifth transistor T5 and sixth transistor T6 are turned on by the first light emitting signal EM1, and a current path connected from the first driving voltage ELVDD through the light emitting element LED, the fifth transistor T5, the first transistor T1, and the sixth transistor T6 to the second driving voltage ELVSS is formed. An amount of a current $I_{OLED}$ flowing along the current path is determined according to a degree at which the first transistor T1 is turned on, and the degree at which the first transistor T1 is turned on is determined according to the data voltage VDATA applied to the gate electrode thereof. The light emitting element LED differently displays brightness according to the amount of the current $I_{LED}$ flowing along the current path.

Comparing FIG. 25 and FIG. 26, it can be seen that the voltage value of the gate electrode is changed by ΔV. The reason for the difference in ΔV may be the same as that described with reference to FIG. 15 and FIG. 16, and thus an additional description thereof will be omitted.

Here, the voltage value of the first driving voltage ELVDD may be set to be greater than a value obtained by subtracting the threshold voltage value of the first transistor T1 from the voltage value of the reference voltage Vref, and the voltage value of the second driving voltage ELVSS may be set to be smaller than a value obtained by subtracting the threshold voltage value of the first transistor T1 from the voltage value of the reference voltage Vref.

In the above, various driving methods based on the pixel of FIG. 21 have been described.

Hereinafter, a modified embodiment of the pixel of FIG. 21 will be described with reference to FIG. 27 to FIG. 30.

FIG. 27 to FIG. 30 illustrate equivalent circuit diagrams of a modified pixel of the embodiment of FIG. 21.

Hereinafter, portions different from FIG. 21 will be mainly described.

Figure 27:
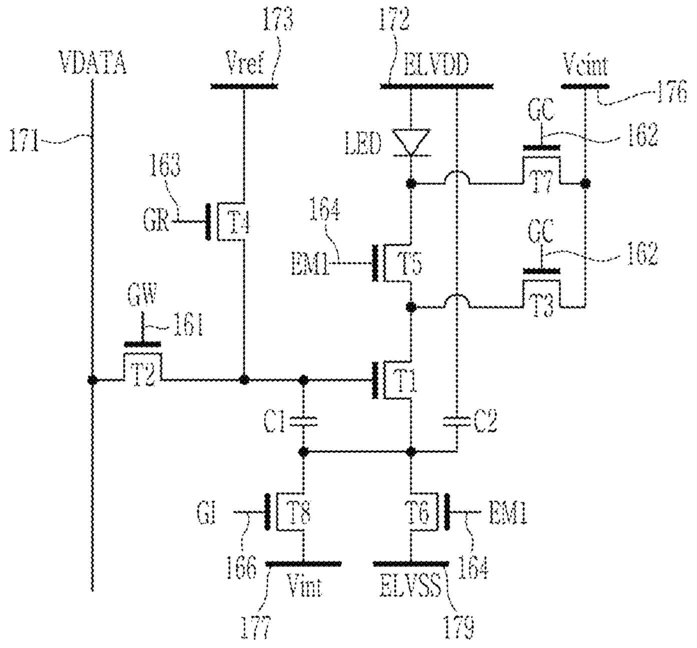
FIG. 27 to FIG. 30 illustrate equivalent circuit diagrams of a modified pixel of the embodiment of FIG. 21.

The embodiment of FIG. 27 differs from the embodiment of FIG. 21 in that the first electrodes of the third transistor T3 and the seventh transistor T7 are not connected to the first driving voltage line 172 but are connected to an additional initialization voltage line 176 to which an additional initialization voltage Vcint is applied. Here, the additional initialization voltage Vcint may have a positive voltage value similar to the first driving voltage ELVDD. In addition, in some embodiments, a bias voltage may be applied instead of the additional initialization voltage Vcint.

Figure 28:
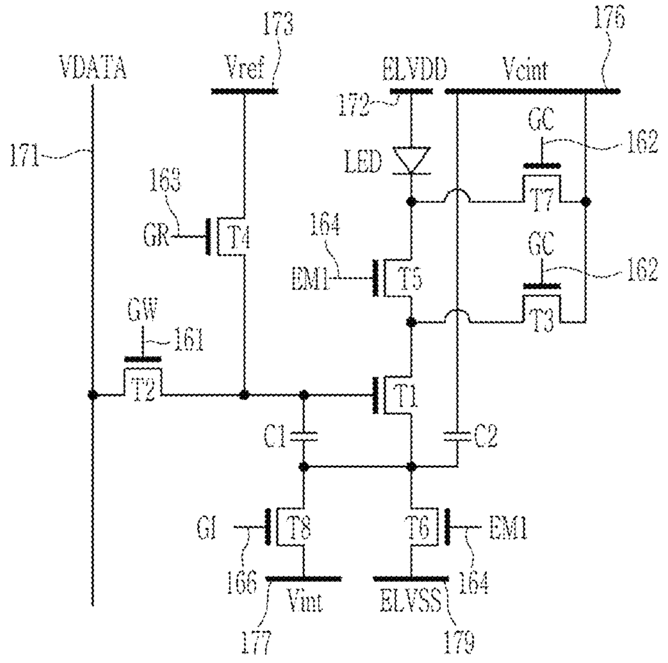

The embodiment of FIG. 28 is an embodiment in which all the first electrodes of the third transistor T3 and the seventh transistor T7 and the first electrode of the second capacitor C2 are connected to the additional initialization voltage line 176, different from the embodiment of FIG. 27.

Figure 29:
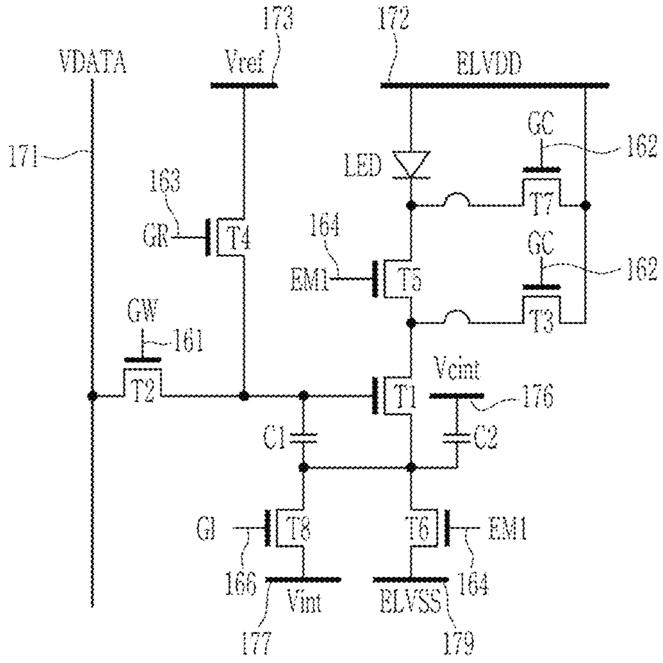

The embodiment of FIG. 29 is an embodiment in which only the first electrode of the second capacitor C2 is connected to the additional initialization voltage line 176, unlike the embodiment of FIG. 21. Meanwhile, in some embodiments, various voltages such as the reference voltage Vref, the second driving voltage ELVSS, or a ground voltage may be applied to the first electrode of the second capacitor C2.

Figure 30:
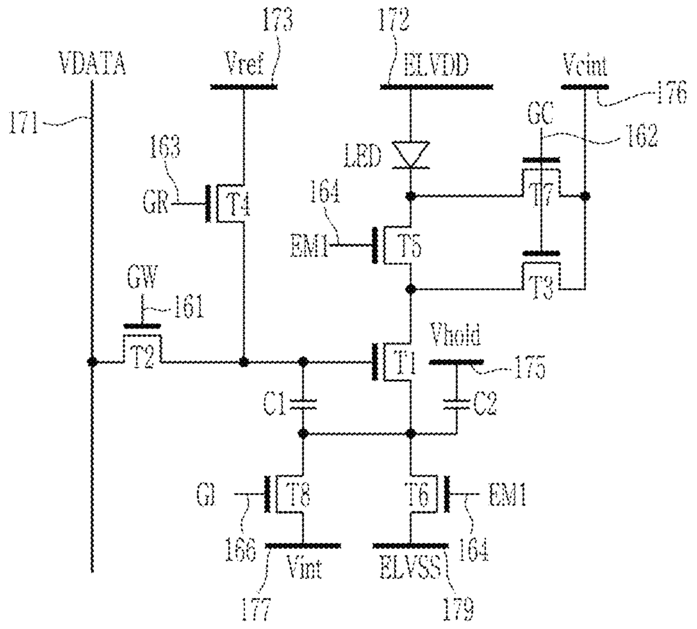

The embodiment of FIG. 30 is an embodiment in which the first electrodes of the third transistor T3 and the seventh transistor T7 are connected to the additional initialization voltage line 176, and the first electrode of the second capacitor C2 is connected to a hold voltage line 175 to which a hold voltage Vhold is applied. Here, the hold voltage Vhold may have a voltage value between the first driving voltage ELVDD and the second driving voltage ELVSS. Meanwhile, in some embodiments, various voltages such as the reference voltage Vref, the second driving voltage ELVSS, or a ground voltage may be applied to the first electrode of the second capacitor C2 instead of the hold voltage Vhold.

Meanwhile, in the modified embodiment of FIG. 27, FIG. 28, and FIG. 30, the voltage value of the additional initialization voltage Vcint or the bias voltage applied to the first electrode of the third transistor T3 may be set to be greater than a value obtained by subtracting the threshold voltage value Vth of the driving transistor T1 from the voltage value of the reference voltage Vref.

In the above, the structure and operation of the pixel circuit of FIG. 21 and the modified circuit structure of the pixel of FIG. 21 have been described.

Hereinafter, a structure of the light emitting element LED stacked on an upper portion of a pixel driver may vary according to respective embodiments, which will be described with reference to FIG. 31 and FIG. 32, respectively.

Figure 31:
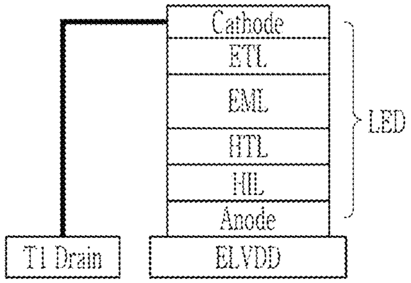
FIG. 31 and FIG. 32 schematically illustrate a stack structure of a light emitting element and a connection structure with a first transistor according to an embodiment.
Figure 32:
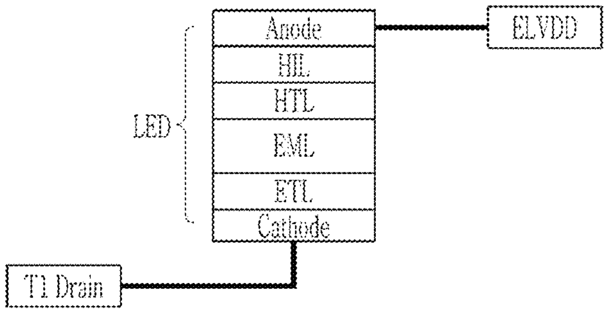

FIG. 31 and FIG. 32 schematically illustrate a stack structure of a light emitting element and a connection structure with a first transistor according to an embodiment.

First, a stacked structure of the light emitting element LED of FIG. 31 will be described.

The light emitting element LED of FIG. 31 is an embodiment in which a cathode (Cathode) is positioned at an uppermost portion by being stacked from an anode (Anode) positioned at a lower portion.

Referring specifically to the embodiment of FIG. 31, the light emitting element LED is positioned on the pixel driving circuit including a first electrode (Drain) of the first transistor T1 and the first driving voltage line to which the first driving voltage ELVDD is applied.

In light emitting element LED, the anode (Anode), a hole injection portion ("HIL"), a hole transport portion ("HTL"), a light emitting layer ("EML"), an electron transport portion ("ETL"), and the cathode (Cathode) are sequentially positioned from the lower portion close to a substrate. In some embodiments, an electron injection portion may be further included between the electron transport portion (ETL) and the cathode (Cathode). The light emitting layer (EML) may include at least one of an organic light emitting material and an inorganic light emitting material.

The anode (Anode) is connected to the first driving voltage line to which the first driving voltage ELVDD is applied to transmit the first driving voltage ELVDD, and the cathode (Cathode) is connected to the first electrode (Drain) of the first transistor T1, so that the output current of the first transistor T1 is inputted to the light emitting element LED.

Holes and electrons are respectively injected into the light emitting layer from the anode and cathode electrodes, and light is emitted when excitons in which the injected holes and electrons are combined enter a ground state from an excited state. In this case, the light emitting element LED may emit light of one of the primary colors or white light. Examples of the primary colors may include three primary colors such as red, green, and blue. Another example of the primary colors may include three primary colors such as yellow, cyan, and magenta. On the other hand, in some embodiments, the color display characteristic may be improved by further including an additional color filter or a color conversion layer on the front surface of the light emitting element LED.

In the embodiment shown in FIG. 31, a separate connection structure must be formed to connect the cathode (Cathode) positioned on the upper portion and the first electrode (Drain) of the first transistor T1 positioned on the pixel driving circuit part of the lower portion. However, when the conventional stacking process of the light emitting element LED is performed from the anode (Anode), it can be stacked without changing the process, so there is an advantage that there is no need to separately change the process.

Hereinafter, a stacked structure of the light emitting element LED of FIG. 32 will be described.

The light emitting element LED of FIG. 32 is an embodiment in which an anode (Anode) is positioned at an uppermost portion by being stacked from a cathode (Cathode) positioned at a lower portion.

Referring specifically to the embodiment of FIG. 32, the light emitting element LED is positioned on the pixel driving circuit including the first electrode (Drain) of the first transistor T1.

In light emitting element LED, the cathode (Cathode), the electron transport portion (ETL), the light emitting layer (EML), the hole transport portion (HTL), the hole injection portion (HIL), and the anode (Anode) are sequentially positioned from the lower portion close to a substrate. In some embodiments, an electron injection portion may be further included between the electron transport portion (ETL) and the cathode (Cathode). The light emitting layer (EML) may include at least one of an organic light emitting material and an inorganic light emitting material.

The anode (Anode) is connected to the first driving voltage line to which the first driving voltage ELVDD is applied to transmit the first driving voltage ELVDD, and the cathode (Cathode) is connected to the first electrode (Drain) of the first transistor T1, so that the output current of the first transistor T1 is inputted to the light emitting element LED.

In the embodiment shown in FIG. 32, since the cathode (Cathode) is positioned at the lower portion, the light emitting element LED has a structure in which it is easy to connect the first electrode (Drain) of the first transistor T1 positioned in the pixel driving circuit.

Meanwhile, the connection between the first driving voltage line through which the first driving voltage ELVDD is transmitted and the anode (Anode) may have a structure in which it is electrically connected outside the display area.

Holes and electrons are respectively injected into the light emitting layer from the anode and cathode electrodes, and light is emitted when excitons in which the injected holes and electrons are combined enter a ground state from an excited state. In this case, the light emitting element LED may emit light of one of the primary colors or white light. Examples of the primary colors may include three primary colors such as red, green, and blue. Another example of the primary colors may include three primary colors such as yellow, cyan, and magenta. On the other hand, in some embodiments, the color display characteristic may be improved by further including an additional color filter or a color conversion layer on the front surface of the light emitting element LED.

While this disclosure has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

| <Description of symbols> | |
|---|---|
| T1: first transistor | LED: light emitting element |
| T2: second transistor, data input transistor | |
| T3: third transistor, first voltage transmitting transistor | |
| T4: fourth transistor, reference voltage transmitting transistor | |
| T5: fifth transistor, cathode connecting transistor | |
| T6: sixth transistor, low driving voltage applying transistor | |
| T7: seventh transistor, second voltage transmitting transistor | |
| T8: eighth transistor, initialization voltage transmitting transistor | |
| C1: first capacitor | C2: second capacitor |
| 161: first scan line | 162: second scan line |
| 163: third scan line | 164: first light emitting signal line |
| 165: second light emitting signal line | 166: fourth scan line |
| 171: data line | 172: first driving voltage line |
| 173: reference voltage line | 174: sustain voltage line |
| 175: hold voltage line | Vsus: sustain voltage |
| 176: additional initialization voltage line | |
| 177: initialization voltage line | 179: second driving voltage line |
| Anode: anode | Cathode: cathode |
| ELVDD: high driving voltage | ELVSS: low driving voltage |
| GW: first scan signal | GC: second scan signal |
| GR: third scan signal | EM1: first light emitting signal |
| EM2: second light emitting signal | GI: fourth scan signal |
| VDATA: data voltage | Vref: reference voltage |
| Vcint: additional initialization voltage | |
| Vint: initialization voltage | |

What is claimed is:

1. A light emitting display device comprising:

a light emitting element including a cathode, and an anode connected to a first driving voltage line;

a first transistor including a gate electrode, a first electrode, and a second electrode;

a second transistor including a gate electrode, a first electrode connected to a data line, and a second electrode connected to the gate electrode of the first transistor;

a third transistor including a gate electrode, a first electrode, and a second electrode connected to the first electrode of the first transistor;

a fourth transistor including a gate electrode, a first electrode connected to a reference voltage line, and a second electrode connected to the gate electrode of the first transistor;

a fifth transistor including a gate electrode, a first electrode connected to the cathode, and a second electrode connected to the first electrode of the first transistor;

a sixth transistor including a gate electrode, a first electrode connected to the second electrode of the first transistor, and a second electrode connected to a second driving voltage line;

a seventh transistor including a gate electrode, a first electrode, and a second electrode connected to the cathode;

an eighth transistor including a gate electrode, a first electrode connected to an initialization voltage line, and a second electrode connected to the second electrode of the first transistor;

a first capacitor including a first electrode connected to the gate electrode of the first transistor and a second electrode connected to the second electrode of the first transistor; and a second capacitor including a first electrode and a second electrode connected to the second electrode of the first transistor, wherein in an initialization period, the gate electrode of the fourth transistor receives a gate-on voltage before the gate electrode of the eighth transistor receives the gate-on voltage.

2. The light emitting display device of claim 1, wherein:

the gate electrode of the second transistor is connected to a first scan line;

the gate electrode of the third transistor and the gate electrode of the seventh transistor are connected to a second scan line;

the gate electrode of the fourth transistor is connected to a third scan line; and the gate electrode of the eighth transistor is connected to a fourth scan line.

3. The light emitting display device of claim 2, wherein in the initialization period, the gate-on voltage of the fourth transistor is applied to the third scan line, the gate-on voltage of the eighth transistor is applied to the fourth scan line, a gate-off voltage of the second transistor is applied to the first scan line, and a gate-off voltage of the third transistor and the seventh transistor is applied to the second scan line.

4. The light emitting display device of claim 3, wherein in a compensation period, a gate-on voltage of the third transistor and the seventh transistor is applied to the second scan line, the gate-on voltage of the fourth transistor is applied to the third scan line, the gate-off voltage of the second transistor is applied to the first scan line, and a gate-off voltage of the eighth transistor is applied to the fourth scan line.

5. The light emitting display device of claim 4, wherein in a writing period, a gate-on voltage of the second transistor is applied to the first scan line, the gate-off voltage of the third transistor and the seventh transistor is applied to the second scan line, a gate-off voltage of the fourth transistor is applied to the third scan line, and the gate-off voltage of the eighth transistor is applied to the fourth scan line.

6. The light emitting display device of claim 2, wherein the gate electrode of the fifth transistor and the gate electrode of the sixth transistor are connected to a first light emitting signal line.

7. The light emitting display device of claim 6, wherein in a light emitting period, a gate-on voltage of the fifth transistor and the sixth transistor is applied to the first light emitting signal line, a gate-off voltage of the second transistor is applied to the first scan line, a gate-off voltage of the third transistor and the seventh transistor is applied to the second scan line, a gate-off voltage of the fourth transistor is applied to the third scan line, and a gate-off voltage of the eighth transistor is applied to the fourth scan line.

8. The light emitting display device of claim 1, wherein the first electrode of the third transistor and the first electrode of the seventh transistor are connected to the first driving voltage line.

9. The light emitting display device of claim 1, wherein the first electrode of the third transistor and the first electrode of the seventh transistor receive a voltage different from a voltage applied to the first driving voltage line.

10. The light emitting display device of claim 1, wherein the first electrode of the second capacitor is connected to the first driving voltage line.

11. The light emitting display device of claim 1, wherein the first electrode of the second capacitor receives a voltage different from a voltage applied to the first driving voltage line.

12. An electronic device comprising:

a light emitting element including a cathode, and an anode connected to a first driving voltage line;

a first transistor including a gate electrode, a first electrode, and a second electrode;

a second transistor including a gate electrode, a first electrode connected to a data line, and a second electrode connected to the gate electrode of the first transistor;

a third transistor including a gate electrode, a first electrode, and a second electrode connected to the first electrode of the first transistor;

a fourth transistor including a gate electrode, a first electrode connected to a reference voltage line, and a second electrode connected to the gate electrode of the first transistor;

a fifth transistor including a gate electrode, a first electrode connected to the cathode, and a second electrode connected to the first electrode of the first transistor;

a sixth transistor including a gate electrode, a first electrode connected to the second electrode of the first transistor, and a second electrode connected to a second driving voltage line;

a seventh transistor including a gate electrode, a first electrode, and a second electrode connected to the cathode;

an eighth transistor including a gate electrode, a first electrode connected to an initialization voltage line, and a second electrode connected to the second electrode of the first transistor;

a first capacitor including a first electrode connected to the gate electrode of the first transistor and a second electrode connected to the second electrode of the first transistor; and a second capacitor including a first electrode and a second electrode connected to the second electrode of the first transistor, wherein in an initialization period, the gate electrode of the fourth transistor receives a gate-on voltage before the gate electrode of the eighth transistor receives the gate-on voltage.

13. The electronic device of claim 12, wherein:

the gate electrode of the second transistor is connected to a first scan line;

the gate electrode of the third transistor and the gate electrode of the seventh transistor are connected to a second scan line;

the gate electrode of the fourth transistor is connected to a third scan line; and the gate electrode of the eighth transistor is connected to a fourth scan line.

14. The electronic device of claim 13, wherein in the initialization period, the gate-on voltage of the fourth transistor is applied to the third scan line, the gate-on voltage of the eighth transistor is applied to the fourth scan line, a gate-off voltage of the second transistor is applied to the first scan line, and a gate-off voltage of the third transistor and the seventh transistor is applied to the second scan line.

15. The electronic device of claim 14, wherein in a compensation period, a gate-on voltage of the third transistor and the seventh transistor is applied to the second scan line, the gate-on voltage of the fourth transistor is applied to the third scan line, the gate-off voltage of the second transistor is applied to the first scan line, and a gate-off voltage of the eighth transistor is applied to the fourth scan line.

16. The electronic device of claim 15, wherein in a writing period, a gate-on voltage of the second transistor is applied to the first scan line, the gate-off voltage of the third transistor and the seventh transistor is applied to the second scan line, a gate-off voltage of the fourth transistor is applied to the third scan line, and the gate-off voltage of the eighth transistor is applied to the fourth scan line.

17. The electronic device of claim 13, wherein the gate electrode of the fifth transistor and the gate electrode of the sixth transistor are connected to a first light emitting signal line.

18. The electronic device of claim 17, wherein in a light emitting period, a gate-on voltage of the fifth transistor and the sixth transistor is applied to the first light emitting signal line, a gate-off voltage of the second transistor is applied to the first scan line, a gate-off voltage of the third transistor and the seventh transistor is applied to the second scan line, a gate-off voltage of the fourth transistor is applied to the third scan line, and a gate-off voltage of the eighth transistor is applied to the fourth scan line.

19. The electronic device of claim 12, wherein the first electrode of the third transistor and the first electrode of the seventh transistor are connected to the first driving voltage line.

20. A light emitting display device comprising:

a light emitting element including a cathode, and an anode connected to a first driving voltage line;

a first transistor including a gate electrode, a first electrode, and a second electrode;

a second transistor including a gate electrode, a first electrode connected to a data line, and a second electrode connected to the gate electrode of the first transistor;

a third transistor including a gate electrode, a first electrode, and a second electrode connected to the first electrode of the first transistor;

a fourth transistor including a gate electrode, a first electrode connected to a reference voltage line, and a second electrode connected to the gate electrode of the first transistor;

a fifth transistor including a gate electrode, a first electrode connected to the cathode, and a second electrode connected to the first electrode of the first transistor;

a sixth transistor including a gate electrode, a first electrode connected to the second electrode of the first transistor, and a second electrode connected to a second driving voltage line;

a seventh transistor including a gate electrode, a first electrode, and a second electrode connected to the cathode;

an eighth transistor including a gate electrode, a first electrode connected to an initialization voltage line, and a second electrode connected to the second electrode of the first transistor;

a first capacitor including a first electrode connected to the gate electrode of the first transistor and a second electrode connected to the second electrode of the first transistor; and a second capacitor including a first electrode and a second electrode connected to the second electrode of the first transistor, wherein the gate electrode of the second transistor is connected to a first scan line, the gate electrode of the third transistor and the gate electrode of the seventh transistor are connected to a second scan line, the gate electrode of the fourth transistor is connected to a third scan line, and the gate electrode of the eighth transistor is connected to a fourth scan line, wherein the gate electrode of the fifth transistor and the gate electrode of the sixth transistor are connected to a first light emitting signal line, and wherein in a light emitting period, a gate-on voltage of the fifth transistor and the sixth transistor is applied to the first light emitting signal line, a gate-off voltage of the second transistor is applied to the first scan line, a gate-off voltage of the third transistor and the seventh transistor is applied to the second scan line, a gate-off voltage of the fourth transistor is applied to the third scan line, and a gate-off voltage of the eighth transistor is applied to the fourth scan line.

* * * * *